(12) United States Patent
Binder et al.

(10) Patent No.: US 11,371,824 B2
(45) Date of Patent: Jun. 28, 2022

(54) STRAY FIELD ROBUST OUT OF SHAFT ANGLE SENSOR AND MEASUREMENT SYSTEM

(71) Applicant: Infineon Technologies AG, Neubiberg (DE)

(72) Inventors: Gernot Binder, Klagenfurt (AT); Benjamin Kollmitzer, Pörtschach (AT); Peter Slama, Klagenfurt (AT)

(73) Assignee: Infineon Technologies AG, Neubiberg (DE)

( * ) Notice: Subject to any disclaimer, the term of this patent is extended or adjusted under 35 U.S.C. 154(b) by 110 days.

(21) Appl. No.: 16/690,934

(22) Filed: Nov. 21, 2019

(65) Prior Publication Data

US 2021/0156664 A1 May 27, 2021

(51) Int. Cl.
*G01B 7/30* (2006.01)
(52) U.S. Cl.
CPC ..................... *G01B 7/30* (2013.01)
(58) Field of Classification Search
CPC ..................................................... G01B 7/30
See application file for complete search history.

(56) References Cited

U.S. PATENT DOCUMENTS

| 10,627,256 | B2* | 4/2020 | Nishioka | G01B 7/30 |
| 2015/0022192 | A1* | 1/2015 | Ausserlechner | G01B 7/30 |
| | | | | 324/207.25 |
| 2016/0258781 | A1* | 9/2016 | Ausserlechner | G01D 5/16 |
| 2017/0322233 | A1* | 11/2017 | Grambichler | G01P 13/045 |
| 2018/0087888 | A1* | 3/2018 | Ausserlechner | G01B 7/30 |
| 2019/0271568 | A1* | 9/2019 | Kozomora | G01D 5/142 |

* cited by examiner

*Primary Examiner* — Reena Aurora
(74) *Attorney, Agent, or Firm* — Banner & Witcoff Ltd.

(57) ABSTRACT

The described techniques address the issues associated with conventional OoS sensor systems by mounting a magnetized ring onto a rotatable shaft for which an angular position is to be measured. Specific sensor configurations are disclosed regarding each magnetic sensor's position with respect to one another and each magnetic sensor's position with respect to the rotatable shaft. The described configurations provide a stray-field robust solution due to the specific magnetic sensor configurations such that, when stray fields are present, pairs of magnetic sensors are exposed to essentially the same stray field components, which thus cancel one another. Thus, the angle of the rotatable shaft as a function of the measured strength of the magnetic field components at any time instant can be calculated even in the present of stray magnetic fields.

24 Claims, 16 Drawing Sheets

US 11,371,824 B2

STRAY FIELD ROBUST OUT OF SHAFT ANGLE SENSOR AND MEASUREMENT SYSTEM

TECHNICAL FIELD

Aspects described herein generally relate to sensors and, more particularly, to Out of Shaft (OoS) sensor systems.

BACKGROUND

Out of Shaft (OoS) sensor systems are used to measure the angular position of a rotating shaft when the ends of the shaft are inaccessible. OoS sensor systems are required to provide precise angular position data and, because the sensors often operate in a noisy environment in terms of electromagnetic fields, need to be robust with respect to stray magnetic fields. Current solutions to ensure high accuracy measurements for OoS systems in the environment of stray magnetic fields have been inadequate.

BRIEF DESCRIPTION OF THE DRAWINGS/FIGURES

The accompanying drawings, which are incorporated herein and form a part of the specification, illustrate the aspects of the present disclosure and, together with the description, further serve to explain the principles of the aspects and to enable a person skilled in the pertinent art to make and use the aspects.

The example aspects of the present disclosure will be described with reference to the accompanying drawings. The drawing in which an element first appears is typically indicated by the leftmost digit(s) in the corresponding reference number.

SUMMARY

Figure 1B:
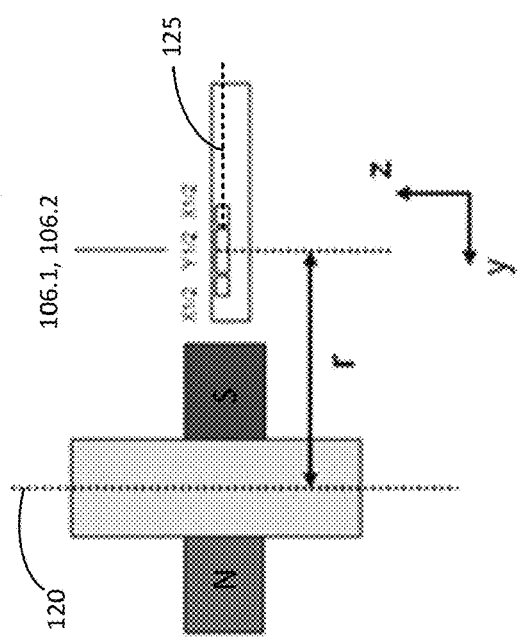
FIGS. 1A-1B illustrate a first Out of Shaft (OoS) sensor system configuration, in accordance with an embodiment of the disclosure.

Certain applications require the use of an OoS sensor system to measure or track the angle of a rotatable shaft when access to the ends of the shaft is not possible. To accomplish this, conventional OoS systems include the use of magnetic resolvers, an example of which is manufactured by the Tamagawa Seiki co. Ltd. of Tokyo, Japan. Additional details regarding such resolvers can be found at http://www.tamagawa-seiki.com/products/resolver-synchro/.

Such magnetic resolvers typically include a paramagnetic ring of a special shape that is fixed onto a rotatable shaft. This paramagnetic ring rotates inside an assembly of two sets of coils. The first set of coils generates an AC magnetic field, while the second set of coils picks up the AC magnetic field. The magnetic coupling between the two sets of coils is modulated by the angular position of the paramagnetic ring. Similar to the core of a transformer, the coupling changes if more or less paramagnetic material of the ring is present between the two sets of coils. In other words, the rotor part modulates the air-gap between excitation and receiving coils. Therefore, precise positioning of the stator part (coils) and rotor part (gear tooth) is required. Such solutions require a great deal of effort, time during assembly and maintenance, and thus are associated with a relatively high cost of manufacture. In addition, special mounting parts (rings, bushes, screws, etc.) are necessary to ensure permanent fixation of the stator and rotor parts, which also increases the size and cost of the system.

Thus, the embodiments described herein address the issues associated with conventional OoS sensor systems by mounting a magnetized ring onto a rotatable shaft for which an angular position is to be measured. As explained in further detail below, this may include the use of a diametrically magnetized ring having two magnetic poles or a magnetized ring having any suitable number of additional magnetic poles. The embodiments described herein may utilize more than one magnetic sensor and leverage specific sensor configurations regarding each magnetic sensor's position with respect to one another and each magnetic sensor's position with respect to the rotatable shaft to provide a stray-field robust solution. In particular, as the shaft rotates, the magnetic ring also rotates while the sensors remain stationary. Based upon the specific sensor configurations as further discussed herein, each sensor may measure the strength of respective magnetic field components generated by the magnetic ring. In this way, when stray fields are present, the sensor configurations ensure that pairs of magnetic sensors are exposed to essentially the same stray field components, which thus cancel one another and be compensated as part of data processing operations to calculate the angle of the rotatable shaft as a function of the measured strength of the magnetic field components at any time instant.

The embodiments described herein are advantageously cost effective, requiring only a standard magnet ring and a magnetic sensor arrangement that includes at least two magnetic sensors, each of which may include at least two magnetic sensor elements. Also, the space required for operation of the OoS embodiments described herein is considerably less than the state of the art realizations, and the safe operating area of the OoS sensor embodiments described herein is also significantly larger compared to state-of-the art OoS sensors. For instance, conventional resolver/inductive sensors will provide accurate measurements only when the positioning tolerances between the stator and rotor part are maintained within a few tenths of a millimeter. The magnetic OoS sensor system embodiments described herein are more robust with respect to such positioning tolerances, and require less effort and cost for assembly and maintenance.

DETAILED DESCRIPTION

In the following description, numerous specific details are set forth in order to provide a thorough understanding of the aspects of the present disclosure. However, it will be apparent to those skilled in the art that the aspects, including structures, systems, and methods, may be practiced without these specific details. The description and representation herein are the common means used by those experienced or skilled in the art to most effectively convey the substance of their work to others skilled in the art. In other instances, well-known methods, procedures, components, and circuitry have not been described in detail to avoid unnecessarily obscuring aspects of the disclosure.

Figure 1A:
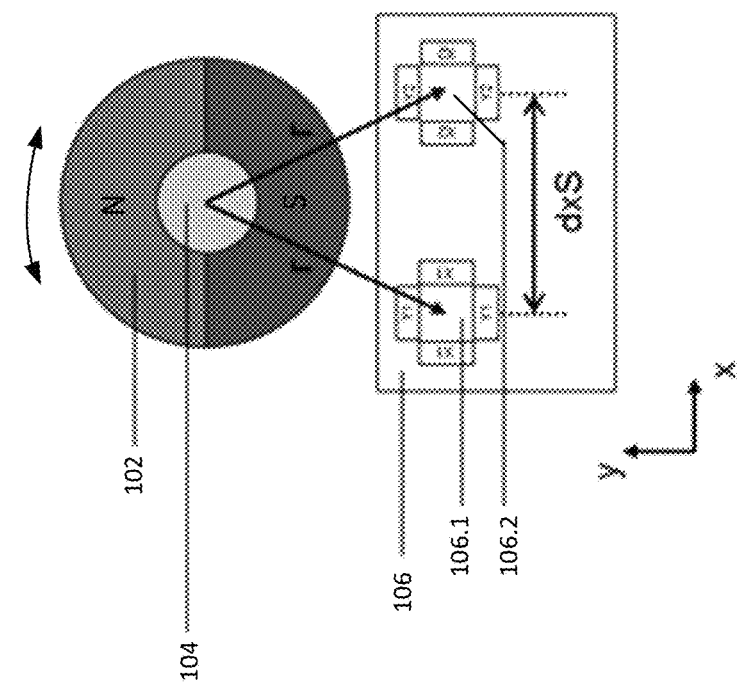
Figure 2:
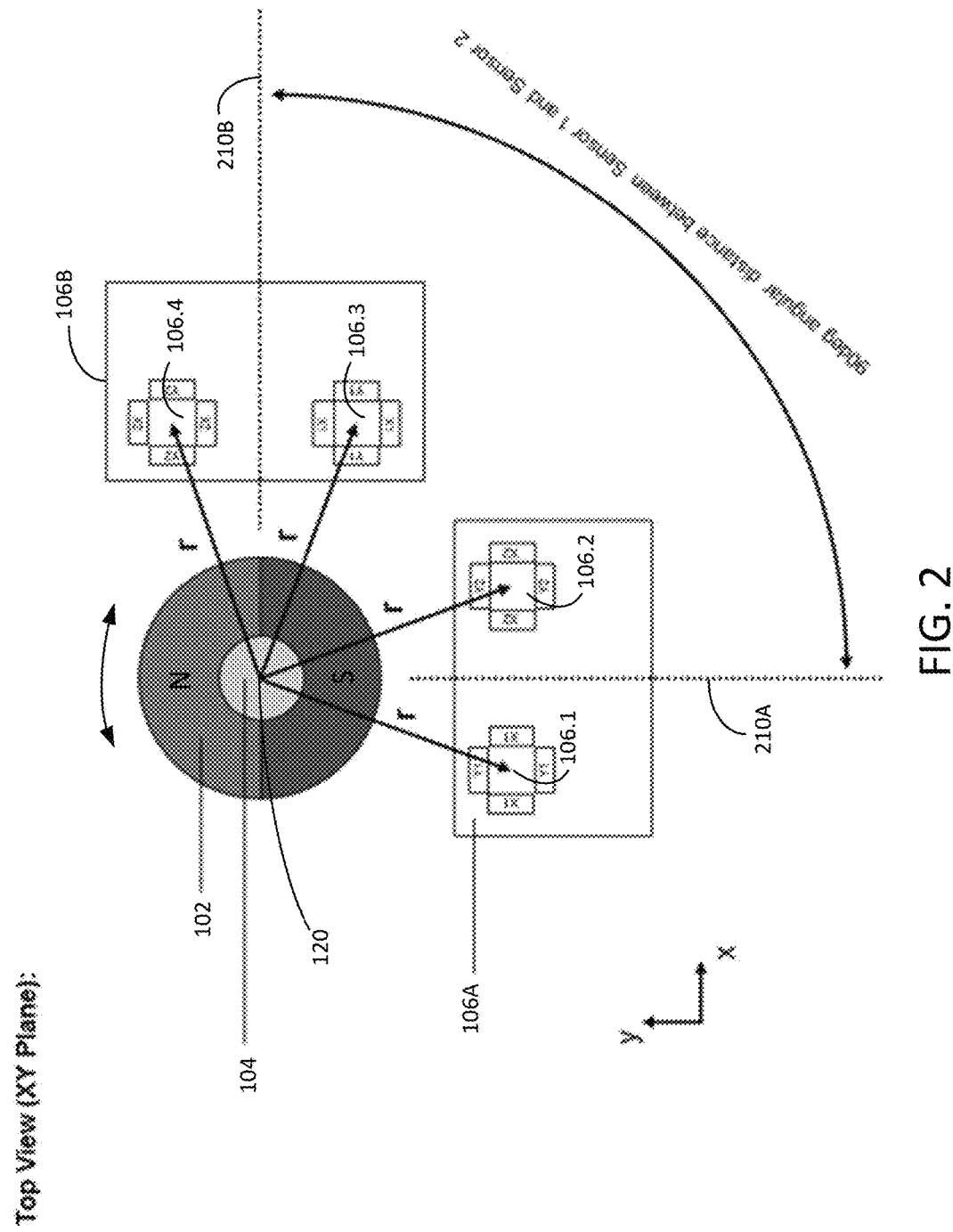
FIG. 2 illustrates the first Out of Shaft (OoS) sensor system configuration as shown in FIGS. 1A-1B with an additional sensor arrangement, in accordance with an embodiment of the disclosure.
Figure 7A:
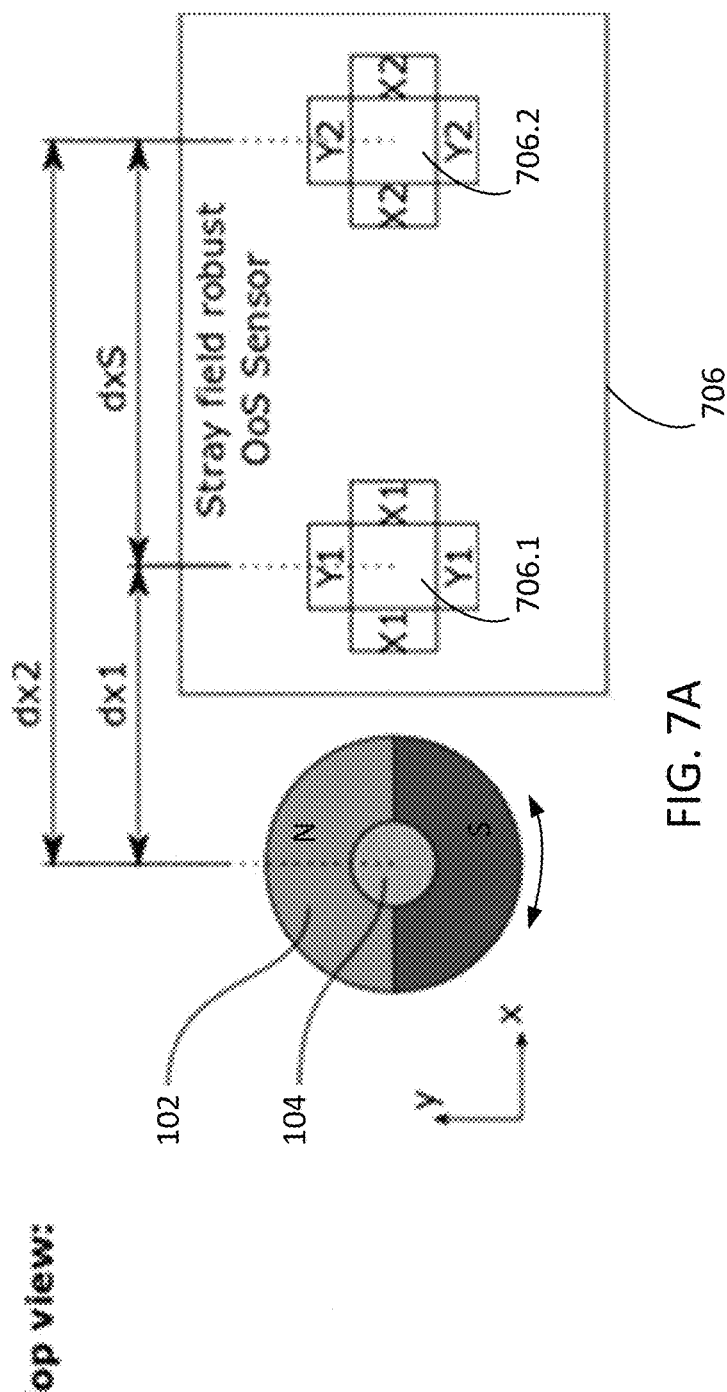
FIGS. 7A-7B illustrate a second Out of Shaft (OoS) sensor system configuration, in accordance with an embodiment of the disclosure.
Figure 7B:
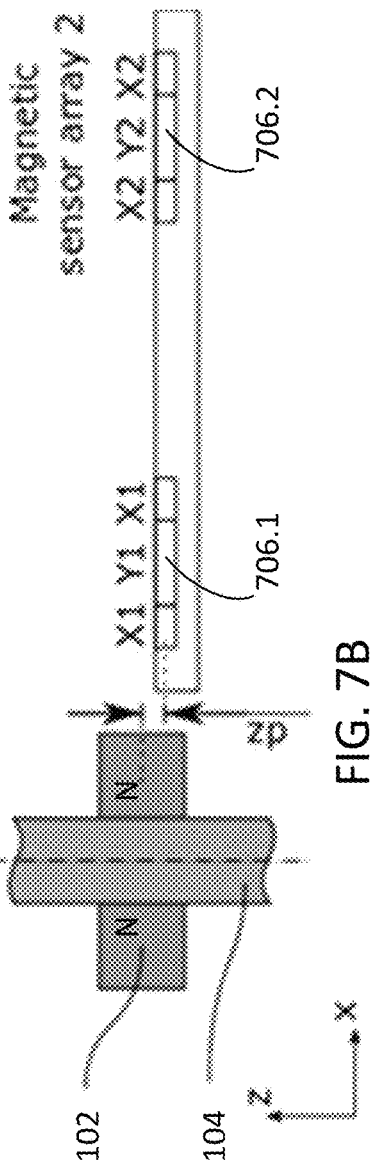
Figure 8:
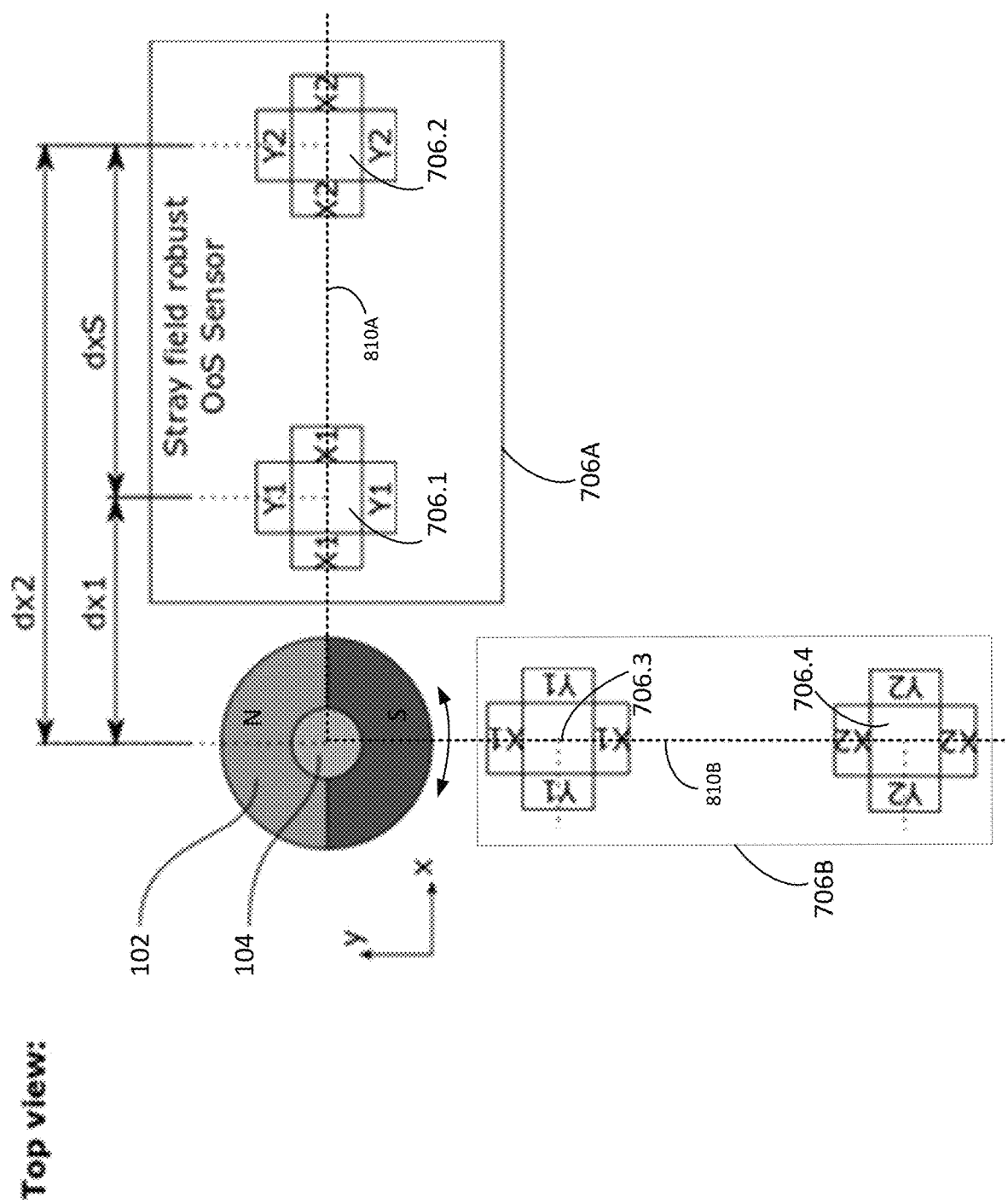
FIG. 8 illustrates the second Out of Shaft (OoS) sensor system configuration as shown in FIGS. 7A-7B with an additional sensor arrangement, in accordance with an embodiment of the disclosure.

The embodiments described herein are described with respect to two different OoS sensor configurations, which are described in further detail herein regarding the position of the individual magnetic sensors with respect to the center axis of the rotatable shaft for which an angle is to be measured. The first configuration, an example of which is shown in FIGS. 1A-1B and 2, each magnetic sensor is positioned an equal distance from the center axis of the rotatable shaft. In the second configuration, an example of which is shown in FIGS. 7A-7B and 8, each magnetic sensor associated with the same sensor arrangement (e.g., two magnetic sensors) is positioned a different distance from the center axis of the rotatable shaft. These configurations are discussed separately as noted below.

Magnetic Sensor Configurations—Equal Radial Distances

FIGS. 1A-1B illustrate an example first Out of Shaft (OoS) sensor system configuration, in accordance with an embodiment of the disclosure. The OoS sensor system 100 is illustrated in a top view in FIG. 1A and in a side view in FIG. 1B. The OoS sensor system 100 includes a magnetic ring 102 that is fixedly mounted to a rotatable shaft 104. Thus, as the rotatable shaft 104 rotates, the magnetic ring 102 also rotates. As further discussed below, the strength of the magnetic field components of the magnetic field generated by the magnetic ring 102 measured by the magnetic sensors 106.1, 106.2 is a function of the angle of rotatable shaft 104 to which the magnetic ring 102 is fixed. The magnetic ring 102 may be implemented as a diametrically magnetized ring, as shown in FIGS. 2A-2B, which has two magnetic poles. However, other embodiments include the magnetic ring 102 being magnetized in accordance with other patterns and including any suitable number of poles. For instance, the magnetic ring 102 may include four magnetic poles, with the magnetic poles on the magnetic ring 102 alternating every 90 degrees instead of 180 degrees (as is the case for the diametrically magnetized ring as shown in FIGS. 2A-2B).

In the example configuration shown in FIGS. 2A-2B, the OoS system 100 includes a magnetic sensor arrangement 106, which includes two magnetic sensors 106.1, 106.2. However, and as further discussed herein, the OoS system 100 may include any suitable number N of magnetic sensors 106.1-106.N, which may be part of the same sensor arrangement or different sensor arrangements (e.g. as shown in FIG. 2 and further discussed below). In various embodiments, the magnetic sensors 106.1-106.N may form part of a respective magnetic sensor arrangement (e.g., sensor arrangement 106) in different configurations. For example, the magnetic sensors 106.1, 106.2 may be formed together as part of the same integrated circuit (IC) such that the sensor arrangement 106 is implemented as an IC. To provide another example, the magnetic sensors 106.1, 106.2 may be formed as separate circuits and mounted to a common chip or substrate, or alternatively be implemented as separate chips. As yet another example, the magnetic sensors 106.1, 106.2, together with other circuit components not shown in FIGS. 1A-1B, may form part of a common chip, substrate, or circuitry that is represented by the sensor arrangement 106 as shown.

Moreover, embodiments include each of the magnetic sensors 106.1, 106.2 being implemented as sensor "arrays," which each array including at least two sensor elements, although the embodiments are not limited to this particular example and may include additional magnetic sensor elements. In the example shown in FIGS. 1A-1B, each of the magnetic sensors 106.1, 106.2 includes two individual magnetic sensor elements, and thus the magnetic sensors 106.1-106.2 in this example are considered two-dimensional (2D) magnetic sensors. In various embodiments, the sensor elements included as part of each respective magnetic sensor 106.1, 106.2, may be implemented as any suitable type of magnetic sensor configured to measure a strength (or value) of a magnetic field component of a magnetic field generated by the magnetic ring 102 in a particular direction depending upon the orientation and physical configuration of the magnetic sensor element with respect to the magnetic field generated by the magnetic ring 102. For example, the magnetic sensor elements may be implemented as Hall elements (e.g. vertical Hall probes and/or lateral Hall plates), magneto resistors (e.g. taking advantage of the anisotropic magnetoresistance (AMR), the giant magnetoresistance (GMR), or the tunnel magnetoresistance (TMR)), etc. The magnetic sensor elements associated with each of the magnetic sensors 106.1-106.N may be implemented with the same type of magnetic sensors or different types of magnetic sensors. In various embodiments, the magnetic sensor elements included as part of each respective magnetic sensor 106.1, 106.2 may generate an electrical signal that represents its respective magnetic field component measurement, as further discussed below.

Regardless of the particular implementation of the magnetic sensor elements, embodiments include each magnetic sensor 106.1, 106.2 performing a measurement of at least two magnetic field components of the magnetic field generated by the magnetic ring 102. These magnetic field components may be in-plane magnetic field components with respect to the orientation of the magnetic ring 102 (i.e. in the x-y plane as shown in FIGS. 1A-1B). In other words, the magnetic field component measured by each magnetic field sensor 106.1, 106.2 may be defined as two perpendicular magnetic field components, one being a magnetic field component $B_x$, which may be considered a radial magnetic field component, and another magnetic field component $B_y$, which may be considered a diametrical magnetic field component.

For example, as shown in FIG. 1A, each magnetic sensor 106.1, 106.2 includes two sensor elements, both of which are disposed in the X-Y plane. In this example, the magnetic ring 102 is oriented parallel with the X-Y plane, as shown in FIGS. 1A-1B. The rotatable shaft 104, as well as its rotation axis 120, extend along the Z-axis, which is perpendicular to the magnetic ring 102, to the X-Y plane, to each magnetic sensor 106.1, 106.2, and to the X- and Y-magnetic field components of the generated magnetic field as measured by the sensor elements X1, X2, Y1, and Y2.

With reference to FIG. 1B, the sensor elements X1, X2, Y1, and Y2 are aligned in a y-direction along a central axis 125, and are also aligned with one another in the z-direction. In various embodiments, the sensor elements X1, X2, Y1, and Y2 may be aligned with a center plane of the magnetic ring 102 such that the central axis 125, when extended, bisects the magnetic ring such that the magnetic ring is disposed an equal distance in the +Z and the −Z direction from the central axis 125 or, alternatively, the sensor elements X1, X2, Y1, and Y2 may be offset in either the +Z or the −Z direction.

With continued reference to FIGS. 1A-1B, each magnetic sensor 106.1, 106.2 includes two magnetic sensor elements—one configured to measure a magnetic field component generated by the magnetic ring 102 in the 'X' direction, and another sensor element configured to measure a magnetic field component in the 'Y' direction. For instance, the magnetic sensor 106.1 includes a sensor element labeled as "X1," which generates an electrical signal that represents a measured strength of a component of the magnetic field generated by the magnetic ring 102 in the 'X' direction. The magnetic sensor 106.2 also includes a sensor element labeled as "X2," which also generates an electrical signal that represents a measured strength of a component of the magnetic field generated by the magnetic ring 102 in the 'X' direction. Similarly, the magnetic sensor 106.1 includes a sensor element labeled as 'Y1,' and the magnetic sensor 106.2 includes a sensor element labeled as "Y2," which each generate, respectively, an electrical signal that represent a measured strength of a component of the magnetic field generated by the magnetic ring 102 in the 'Y' direction. The individual sensor elements will thus be referred to herein as the X1 sensor element, the X2 sensor element, the Y1 sensor element, and the Y2 sensor element (or simply X1, X2, Y1, Y2) to maintain consistency with this notation. For ease of explanation, the magnetic field components measured in each case by each of the X1, X2, Y1, and Y2 sensor elements will also be similarly notated, as further discussed below.

In the present embodiments, the magnetic sensors 106.1, 106.2 have a center that is defined by the X1 and Y1 sensor elements. The magnetic sensors 106.1, 106.2 are thus separated from one another by a spacing distance dxS (i.e. center-to-center) and disposed the same radial distance 'r' from the magnetic ring 102 (i.e. from the center of each magnetic sensor 106.1, 106.2 to the rotation axis 120 of the rotatable shaft 104). In other words, the magnetic sensor 106.1 and the magnetic sensor 106.2 are positioned an equal radial distance from the rotation axis 120 of the rotatable shaft 104, as shown in FIG. 1B, but at different angular positions with respect to the rotation axis 120 of the rotatable shaft 104, as shown in FIG. 1A. Further in accordance with the present embodiments, each of the X1, X2, Y1, and Y2 sensor elements may be located close to the edge of the IC or other substrate associated with the sensor arrangement 106, such that the radial distance 'r' to the center of the shaft is relatively small, thereby enabling a high airgap capability.

In the configuration described in accordance with the present embodiments, the two magnetic sensors 106.1, 106.2 sense the strength of magnetic field components generated by the magnetic ring 102 of essentially equal amplitudes. It is preferable that any magnetic stray fields sources be located significantly further apart from the magnetic sensors 106.1, 106.2, which is referred to herein as a distance $\Delta x$ (not shown). In such a case, in accordance with the present embodiments, as long as the condition $\Delta x \gg dxS$ holds true (e.g., the distance $\Delta x$ is twice, five times, ten times, etc., as the spacing distance dxS), both magnetic sensors 106.1, 106.2 will sense virtually the same stray field components (e.g. within some variation such as 0.01% of one another, 0.1%, 0.5%, 1%, etc.).

Moreover, in the event that the rotatable shaft 104 is implemented as a ferromagnetic shaft, the magnetic flux of stray fields will be concentrated by the rotatable shaft 104, i.e. the homogeneous stray-field is amplified close to the rotatable shaft 104. However, even in such a case, because both magnetic sensors 106.1, 106.2 are located at the same distance 'r' from the rotatable shaft 104, both magnetic sensors 106.1, 106.2 are exposed to essentially the same stray-field, and their respective measurements may be processed to provide accurate results even in the presence of such an amplified stray-field.

In the embodiments discussed herein, and as further discussed below, the aforementioned robustness to stray magnetic fields is facilitated as a result of each magnetic sensor 106.1, 106.2 measuring, as part of each respective magnetic field measurement, the same contribution from stray fields. Thus, in an analogous manner to common-mode signal rejection, the embodiments described herein cancel or at least reduce the stray field contribution present in each respective magnetic field measurement by subtracting the output signals generated by the magnetic sensor 106.1 (e.g. the output signals from the X1 and Y1 sensor elements) from the output signals generated by the magnetic sensor 106.2 (e.g. the output signals from the X1 and Y1 sensor elements). In doing so, so-called "stray field robust" signals are generated that represent the magnetic field components generated by the magnetic ring 102 having a reduced (or eliminated) stray-field influence. Using these stray field robust signals, the angular position of the magnetic ring 102 may in turn be calculated, thereby providing an accurate OoS angle calculation even in the presence of stray magnetic fields.

In various embodiments, the OoS calculations, which are discussed in further detail below, may be performed by different components within the OoS system 100, either independently or in cooperation with one another. For example, the present embodiments include the magnetic sensors 106.1, 106.2, as well as any additional magnetic sensors that may be implemented as part of the OoS system 100, including any suitable configuration of circuitry to facilitate these calculations using the generated output signals. This circuitry may include, for example, controllers and/or processors configured to perform these calculations. Thus, in accordance with such embodiments, the OoS calculations may be performed by the magnetic sensors 106.1-106.N themselves, or alternatively by an external control circuit (ECU) or other suitable processing component.

In other embodiments, however, the magnetic sensors 106.1-106.N may communicate with separate circuitry components (e.g. controllers, processors, etc.) that are configured to perform the OoS calculations, which are not shown for purposes of brevity. These separate circuitry components may, for instance, be integrated as part of the magnetic sensors 106.1-106.N, and may use the signals generated by each sensor element that is part of each magnetic sensor 106.1-106.N. As another example, the separate circuitry components may be incorporated as part of the substrate associated with the sensor arrangement 106 (as well as other sensor arrangements for other magnetic sensors that are implemented as part of the OoS system 100). Of course, one may decide to arrange the circuitry components and the magnetic sensors 106.1-106.N on one or more PCBs instead of the substrate.

When additional magnetic sensors are implemented, the separate processing circuitry may be part of each sensor arrangement 106 associated with each set of magnetic sensors, or one or more separate circuitry components may perform the OoS calculations for each of the magnetic sensors 106.1-106.N within the OoS system 100. As yet another example, separate circuitry components may be located external to the OoS system 100, such as part of a separate controller system, for instance. In embodiments in which the separate circuitry components are not incorporated as part of the magnetic sensors 106.1-106.N, the separate circuitry components may receive the output signals generated by the sensor elements X1, Y1, X2, Y2 associated with each respective magnetic sensor 106.1-106.N within the OoS system 100, and use these generated output signals to calculate the angle of the rotatable shaft 104, as discussed herein. The separate circuitry components may receive the output signals in any suitable manner and in accordance with any suitable communication protocol, such as via wired couplings or a wireless transmission of the signals, in various embodiments.

Regardless of the implementation of the circuitry components used to calculate the angle of the rotatable shaft, this angle may be calculated using the following calculations, which are provided as examples and ease of explanation and not by way of limitation. In various embodiments, the angle of the rotatable shaft 104 may be calculated in any suitable manner using the signals generated by each of the magnetic sensors 106.1, 106.2 and, in particular, using the signals generated by the respective magnetic sensor elements (e.g. X1, X2, Y1, Y2) associated with each respective magnetic sensor 106.1-106.N.

To perform the OoS angle calculations, the magnetic field generated by the magnetic ring 102 at an arbitrary position r are understood to depend on the angular position of the shaft, which may be denoted as θ. The generated magnetic field components, which may again be denoted as X along the 'X' direction and Y along the 'Y' direction, can be described by trigonometric functions, as shown below in Equation 1.

$$X(r,\theta)=A_X(r)\cdot\cos(\theta); Y(r,\theta)=A_Y(r)\cdot\sin(\theta). \quad \text{Eqn. 1:}$$

Additionally, to simplify the calculations, the embodiments described herein assume that the magnetic stray field components Xs and Ys are approximately homogeneous. Such assumptions enable the output signals generated by each of the magnetic sensors (106.1, 106.2 in this example), which again are denoted by X1, Y1, X2, and Y2, as function of the angular position of the shaft θ, to be denoted as shown below in Equation 2.

$$X1(\theta)=Sx\cdot(A_{X1}\cdot\cos(\theta)+Xs), Y1(\theta)=Sy\cdot(A_{Y1}\cdot\sin(\theta)+Ys),$$

$$X2(\theta)=Sx\cdot(A_{X2}\cdot\cos(\theta)+Xs), Y2(\theta)=Sy\cdot(A_{Y2}\cdot\sin(\theta)+Ys). \quad \text{Eqn. 2:}$$

Continuing this example, for ease of explanation equal sensitivities Sx of the two magnetic sensor elements X1 and X2 are assumed, and equal sensitivities Sy of the two magnetic sensor elements Y1 and Y2 are also assumed, as well as vanishing residual offsets for each of the magnetic sensor elements X1, X2, Y1, and Y2. However, the present embodiments also include compensating for instances in which one or more of the assumptions noted above does not hold true, e.g. when the sensitivities Sx of the two magnetic sensor elements X1 and X2 and/or the sensitivities Sy of the two magnetic sensor elements Y1 and Y2 are not equal. These embodiments include, for instance, applying known techniques such as performing offset subtraction, calibrating for the sensor amplitudes, and applying non-orthogonality. As these techniques are known, further details regarding these compensation techniques are not described. The sensitivities Sx and Sy are known quantities based upon a priori knowledge of the particular magnetic sensors 106.1, 106.2 that are used.

Again, as shown in FIGS. 1A-1B, the magnetic sensors 106.1, 106.2 are disposed an equal radial distance 'r' from the rotation axis 120 of the rotatable shaft 104. Due to this, the X-amplitude $A_{X1}$ measured by the X1 sensor element of the magnetic sensor 106.1 is essentially the same (e.g. within 0.01%, 0.1%, 1%, etc.) as the amplitude $A_{X2}$ measured by the X2 sensor element of the magnetic sensor 106.2. Of course, the signals generated by the magnetic sensors 106.1, 106.2 need not be phase-aligned with one another, and may be phase-shifted with respect to one another. This also holds true for the Y1 and Y2 sensor elements, i.e. the Y-amplitude $A_{Y1}$ measured by the Y1 sensor element of the magnetic sensor 106.1 is essentially the same (e.g. within 0.01%, 0.1%, 1%, etc.) as the amplitude $A_{Y2}$ measured by the Y2 sensor element of the magnetic sensor 106.2. Thus, as shown in Equation 3 below, in an embodiment, the magnetic field component measurement signal generated by each two magnetic sensor elements X1 and X2, as well as the magnetic field component measurement signal generated by each two magnetic sensor elements Y1 and Y2, are subtracted from one another to obtain stray-field robust differential signals ΔX(θ), ΔY(θ), which represent respective magnetic field component values (e.g. magnetic field component strengths) as a function of the angle of the rotatable shaft 104.

$$\Delta X(\theta)=X1(\theta)-X2(\theta)=Sx\cdot(A_{X1}-A_{X2})\cdot\cos(\theta),$$

$$\Delta Y(\theta)=Y1(\theta)-Y2(\theta)=Sy\cdot(A_{Y1}-A_{Y2})\cdot\sin(\theta). \quad \text{Eqn. 3:}$$

These stray-field robust differential signals have the same amplitude, but are phase-shifted by 90 degrees. Therefore, embodiments include determining the angle θ of the rotatable shaft 104 by calculating the arctangent of a ratio of the stray-field robust differential signals ΔX(θ), ΔY(θ) as noted above in Equation 3, which is represented below in Equation 4A.

$$\theta = \operatorname{atan}\left(\frac{\Delta Y(\theta)}{\Delta X(\theta)}\right). \quad \text{Eqn. 4}$$

In this way, the present embodiments function to calculate the angular position θ of the rotatable shaft 104 using the output signals of the magnetic sensor 106.1, 106.2. Advantageously, this requires no additional system calibration, as the stray-field robust differential signals ΔX(θ), ΔY(θ) are intrinsically the same amplitude and orthogonal to each other.

Equations 3 and 4 above assume equal amplitude stray-field robust differential signals ΔX(θ), ΔY(θ). However, in the event that this is not the case and these amplitudes deviate by some small amount (e.g., 0.01%, 0.1%, etc.), the embodiments described herein include the use of a matching factor represented herein as k. This matching factor may be used as a calibration factor to compensate for any differences in the amplitude of the stray-field robust differential signals generated by the magnetic field sensors 106.1, 106.2. The use of a matching factor is further discussed below with respect to the embodiments in which the magnetic sensors 106.1, 106.2 are positioned at different radial distances from the rotatable shaft 104, as shown in FIGS. 7A-7B and discussed in further detail below. However, embodiments include also implementing this matching factor when the magnetic sensors 106.1, 106.2 are positioned at equal radial distances from the rotatable shaft 104, as shown in FIGS. 1A-1B, to increase the precision of the shaft angle calculations. This is represented below in Equation 4B, in which the stray-field robust differential signals ΔX(θ), ΔY(θ) are divided and then multiplied by an appropriate matching factor k.

$$\theta = \operatorname{atan}\left(k \cdot \frac{\Delta Y(\theta)}{\Delta X(\theta)}\right). \qquad \text{Eqn. 4A}$$

Nonetheless, using the configuration of OoS system 100 as shown in FIGS. 1A-1B, a small residual angle error may be introduced from the magnetic circuit (e.g. an error that is dependent on the geometry of the magnetic ring 102 and the layout of the magnetic sensors 106.1, 106.2. The signature of this angle error curve is a periodic and sinusoidal signal with 2 periods per mechanical revolution of the rotatable shaft 104, as further described below.

Therefore, to further reduce the angle error of the overall system, additional sensor arrangements 106 may be implemented. For example, FIG. 2 illustrates an OoS sensor system 200, which is similar to the OoS sensor system 100 as shown in FIG. 1A-1B, but implements a second sensor arrangement 106B, which is identical or substantially similar as the sensor arrangement 106 as shown and discussed herein with reference to FIGS. 1A-1B, which has been relabeled in FIG. 2 as sensor arrangement 106A for clarity. Thus, the sensor arrangement 106B also includes two magnetic sensors 106.3, 106.4, each including a magnetic sensor element configured to measure the strength of the X and Y magnetic field components generated by the magnetic ring 102.

Although four magnetic sensors 106.1-106.4 are shown in FIG. 2, the present embodiments described herein are not limited to this particular example, and any suitable number of additional magnetic sensors 106.5-106.N may be used to calculate the angle of the rotatable shaft 104. But regardless of the number of magnetic sensors 106.1-106.N that are implemented, in the present embodiments each magnetic sensor 106.1-106.N is positioned at an equal radial distance 'r' from the axis of rotation of the rotatable shaft 104, as shown in FIG. 2. Further in accordance with the present embodiments and as shown in FIG. 2, regardless of the number of the magnetic sensors 106.1-106.N that are implemented, each magnetic sensor 106.1-106.N is also disposed at a different angular position with respect to the rotation axis of the rotatable shaft 104.

Further, in accordance with the present embodiments, regardless of the number of magnetic sensors 106.1-106.N that are implemented, the calculations used to determine the angle of the rotatable shaft 104 are processed in terms of groupings (e.g. two or more) of the magnetic sensors 106.1-106.N. In the example configuration shown in FIG. 2, the signals representing the measured magnetic field components are processed for the magnetic sensors 106.3, 106.4 in the same manner as discussed above with reference to the magnetic sensors 106.1, 106.2. Further, in accordance with the present embodiments, each pair (or grouping, if a sensor arrangement includes more than two magnetic sensors 106) of the magnetic sensors 106.1-106.N are disposed about the rotation axis of the rotatable shaft 104 in a specific manner to maintain measurement symmetry.

For example, the magnetic sensors 106.1, 106.2, which provide measurements of magnetic field components used to calculate the angle of the rotatable shaft 104 as discussed above, are disposed symmetrically with respect to the rotation axis 120 of the rotatable shaft 104. This symmetry can be described with respect to a central axis 310A, which extends along the Y-axis from the center of the rotation axis 120 of the rotatable shaft 104 and is thus perpendicular to the rotation axis 120. The central axis 210A bisects the magnetic sensor arrangement 106A into two equal and symmetric portions, with the pairs of magnetic sensors 106.1, 106.2 being symmetrically disposed such that, in the example shown in FIG. 2, the magnetic sensors 106.1, 106.2 are each offset from the central axis 210A by an equal distance but in the +X and the −X direction, respectively.

Again, the example OoS sensor system 200 as shown in FIG. 2 includes additional magnetic sensors 106.3, 106.4, which form part of a separate sensor arrangement 106B. The geometric configuration of the magnetic sensors 106.1, 106.2 associated with the magnetic sensor configuration 106A also applies to the magnetic sensors 106.3, 106.4 associated with the magnetic sensor configuration 106B, as well as any additional pairs of magnetic sensors 106 that may be implemented, in accordance with the present embodiments. For instance, the magnetic sensors 106.3, 106.4 are disposed an equal distance from a central axis 210B, which extends along the X-axis from the center of the rotation axis 120 of the rotatable shaft 104 and is thus also perpendicular to the rotation axis 120. The magnetic sensors 106.3, 106.4 are each offset from the central axis 210B by an equal distance in the +Y and the −Y direction, respectively.

In accordance with the present embodiments, each of magnetic sensors 106.1-106.N may be arranged at different angular positions with respect to the rotation axis 120 of the rotatable shaft 104, which may be explained for ease of explanation with respect to the central axes 210A, 210B. For example, as shown in FIG. 2, the magnetic sensors 106.1, 106.2 form part of the sensor arrangement 106A, which is disposed 90 degrees from the sensor arrangement 106B. In other words, the central axes 210A, 210B are disposed 90 degrees apart from one another, while each of the magnetic sensors 106.1-106.4 maintains the same radial distance r from the rotation axis 120 of the rotatable shaft 104.

In the present embodiments, the angular separation between the magnetic sensors 106.1-106.N may be a function of the number of poles associated with a particular implementation of the magnetic ring 102. For example, the example magnetic ring 102 as shown in FIG. 2 is implemented as a diametrically magnetized ring having two poles (one N and one S). In this case, the magnetic sensors 106.1, 106.2 associated with the sensor arrangement 106A, and 106.3, 106.4 associated with the sensor arrangement 106B should be positioned a quarter of a complete revolution of the rotatable shaft 104 to ensure that measurement errors are reduced as a result of each magnetic sensor pair measuring complementary magnetic field components (i.e. the X1 sensor element of the magnetic sensor 106.1 measures the magnetic field component corresponding to that measured by the Y1 sensor element of the magnetic sensor 106.3). This relationship may hold true as additional magnetic sensor pairs 106.5-106.N are implemented. In other words, in present embodiment, the angle between different sets of the adjacent magnetic sensors 106.1-106.N associated with different sensor arrangements (e.g., the angle between the respective central axes 210A, 210B symmetrically bisecting each magnetic sensor arrangement as shown in FIG. 2) may be expressed as 180 degrees/P, with P being equal to a number of poles of the magnetic ring 102.

The use of additional sensor arrangements enables additional angles of the rotatable shaft 104 to be calculated via the measurements provided by each magnetic sensor grouping. For instance, in the example configuration shown in FIG. 2, two pairs of magnetic sensors 106.1, 106.2 and 106.3, 106.4 are shown, with one angle measurement being performed using the magnetic sensor measurements from the magnetic sensors 106.1, 106.2. The measurements provided by the magnetic sensors 106.3, 106.4 result in a second angle calculation of the rotatable shaft 104, which has a corresponding angle error curve that is shifted by 90 degrees with respect to the angle error curve obtained from the magnetic sensors 106.1-106.2. Thus, by calculating the mean value of both measured angles, the angle error from the first and second sensor essentially cancel one another out, substantially reducing the measurement error compared to the result of using the measurements from only one grouping of magnetic sensors (106.1, 106.2) as shown in FIGS. 1A-1B. In particular, taking the mean value of multiple angle measurements in this way results in nearly (e.g., within 0.01%, 0.1%, 1%, etc.) zero degrees of angle error. This is of course limited by the alignment accuracy of both pairs of magnetic sensors, and thus it is preferable that each magnetic sensor 106.1-106.N be aligned at the same radial distance r to the rotation axis 120 of the rotatable shaft 104, as noted above.

Again, embodiments include the OoS sensor system 300 including any suitable number of magnetic sensor pairs 106.1-106.N, with additional magnetic sensor pairs providing additional redundant angle calculations that may further reduce the angle error by taking the mean value of each angle calculation. Thus, the number of magnetic sensors 106.1-106.N that may be implemented by the OoS sensor system 300 may be a recognized tradeoff between the required accuracy for a particular implementation and the resulting system cost and complexity.

Figure 3:
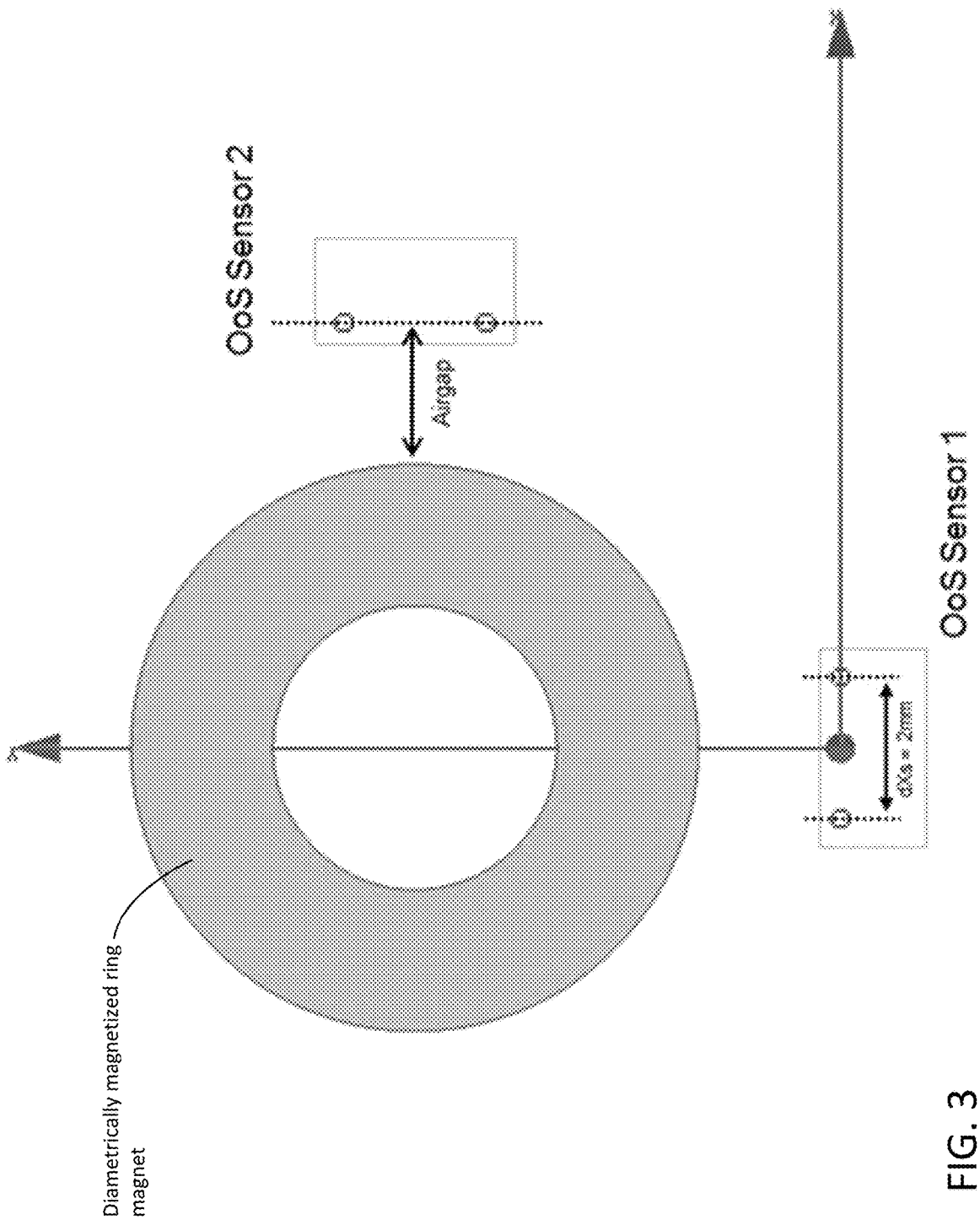
FIG. 3 illustrates a simulation model of the Out of Shaft (OoS) sensor system configuration as shown in FIG. 2, in accordance with an embodiment of the disclosure.

For clarity and ease of explanation, FIG. 3 illustrates a simulation model of the Out of Shaft (OoS) sensor system configuration as shown in FIG. 2, in accordance with an embodiment of the disclosure. The simulation was constructed using magnetic FE simulations in ANSYS Maxwell 3D. The example simulation model 300 as shown in FIG. 3 includes a diametrically magnetized ring magnet, which can be identified with the magnetic ring 102 as shown in FIG. 3. Moreover, the OoS sensor 1 may be identified with the sensor arrangement 106A as shown in FIG. 2, which includes the two magnetic sensors 106.1, 106.2, whereas the OoS sensor 2 may be identified with the sensor arrangement 106B as shown in FIG. 2, which includes the two magnetic sensors 106.3, 106.4. For the simulation, a diametrically magnetized sintered Nd magnet. The diametrically magnetized Nd magnet has an outer diameter of 8 mm, an inner diameter of 4 mm, and a height of 3 mm. To model the magnetic sensors 106.1-106.4, a spacing distance (dXs) of 2 mm between the two magnetic sensors 106.1, 106.2 and 106.3, 106.4 was selected. Moreover, each magnetic sensor 106.1-106.4 was modeled as a vertical Hall plate measuring 25 µm*150 µm.

The simulated model 300 also includes an airgap dimension as shown, which represents the distance from surface of the magnetic ring 102 to a virtual connection line formed between the two magnetic sensors (in this case the magnetic sensors 106.3, 106.4). As further discussed below, the simulation was performed for airgap dimensions of 1.5 mm, 2.0 mm and 2.5 mm.

Figure 4A:
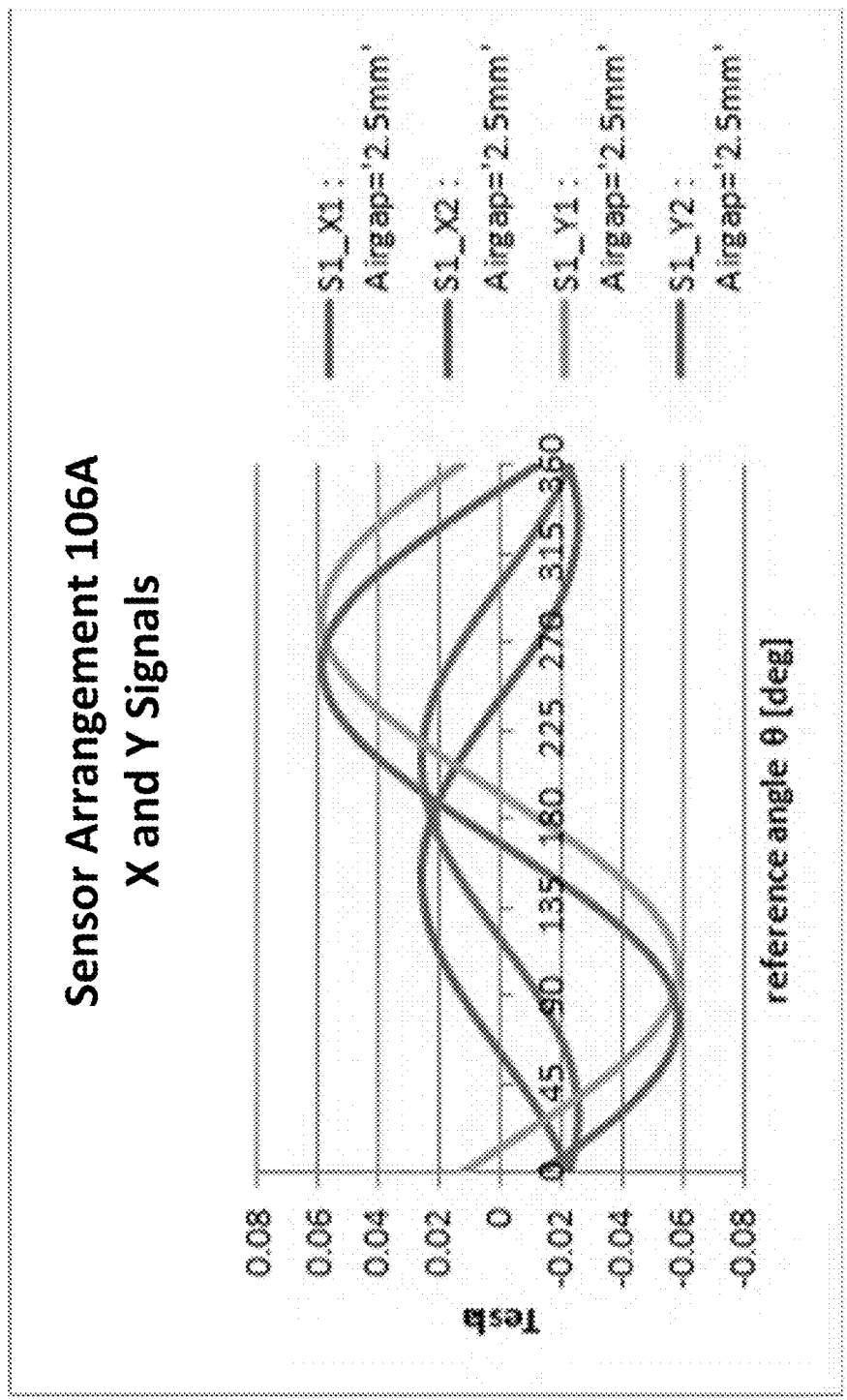
FIGS. 4A-4C illustrate simulation measurements associated with the first OoS sensor arrangement (OoS Sensor 1) corresponding to the simulation model as shown in FIG. 3, in accordance with an embodiment of the disclosure.
Figure 4B:
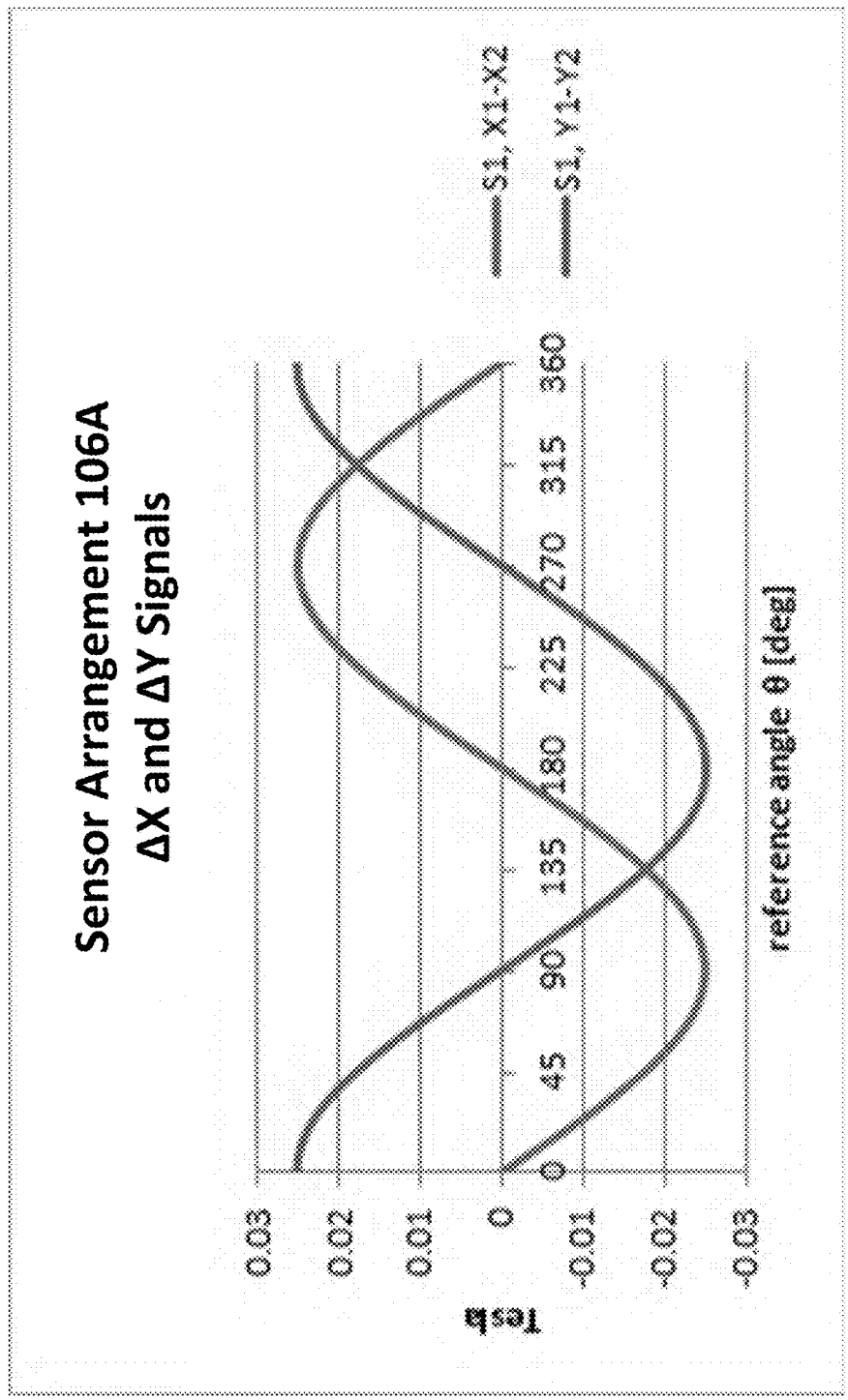
Figure 4C:
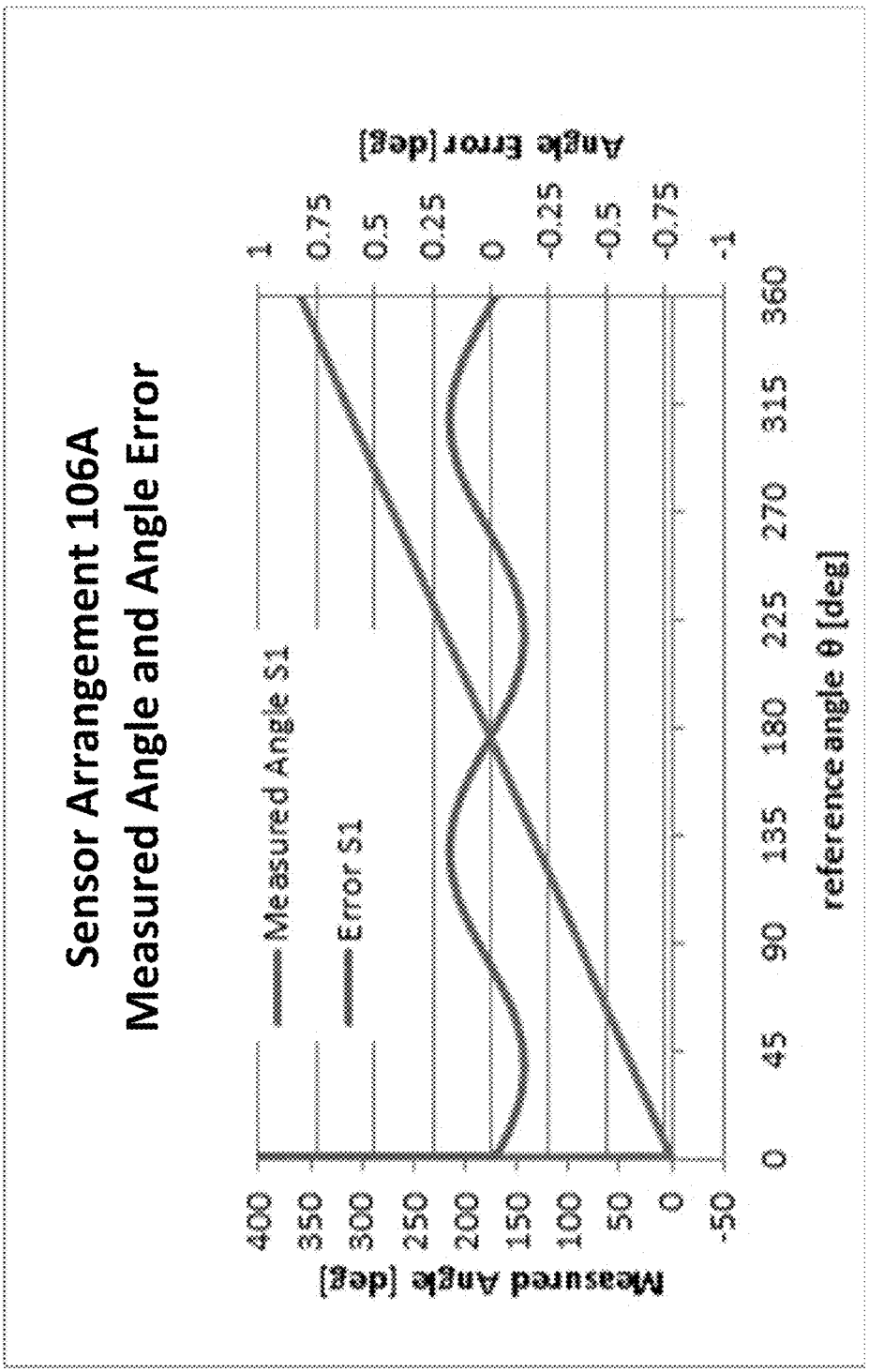

FIGS. 4A-4C illustrate simulation measurements associated with the first OoS sensor arrangement corresponding to the simulation model as shown in FIG. 3, in accordance with an embodiment of the disclosure. FIG. 4A illustrates the raw X and Y signals of each sensor element associated with the magnetic sensors 106.1, 106.2 as a function of the reference angular shaft position θ (a pre-set, predetermined, or otherwise known angle value that functions as a reference) of the rotatable shaft 104, as discussed above with reference to Equation 3. From this simulation result, signals representing the stray field robust intermediate quantities $\Delta X(\theta)=X1-X2$ and $\Delta Y(\theta)=Y1-Y2$ as a function of the reference angular shaft position θ of the rotatable shaft 104 are derived, as shown in FIG. 4B. Moreover, using the stray field robust intermediate quantities $\Delta X(\theta)$ and $\Delta Y(\theta)$ as shown in FIG. 4B, the reference angular position θ of the rotatable shaft 104 at any point in time may be calculated, as shown in FIG. 4C with an accompanying angle error.

Figure 5A:
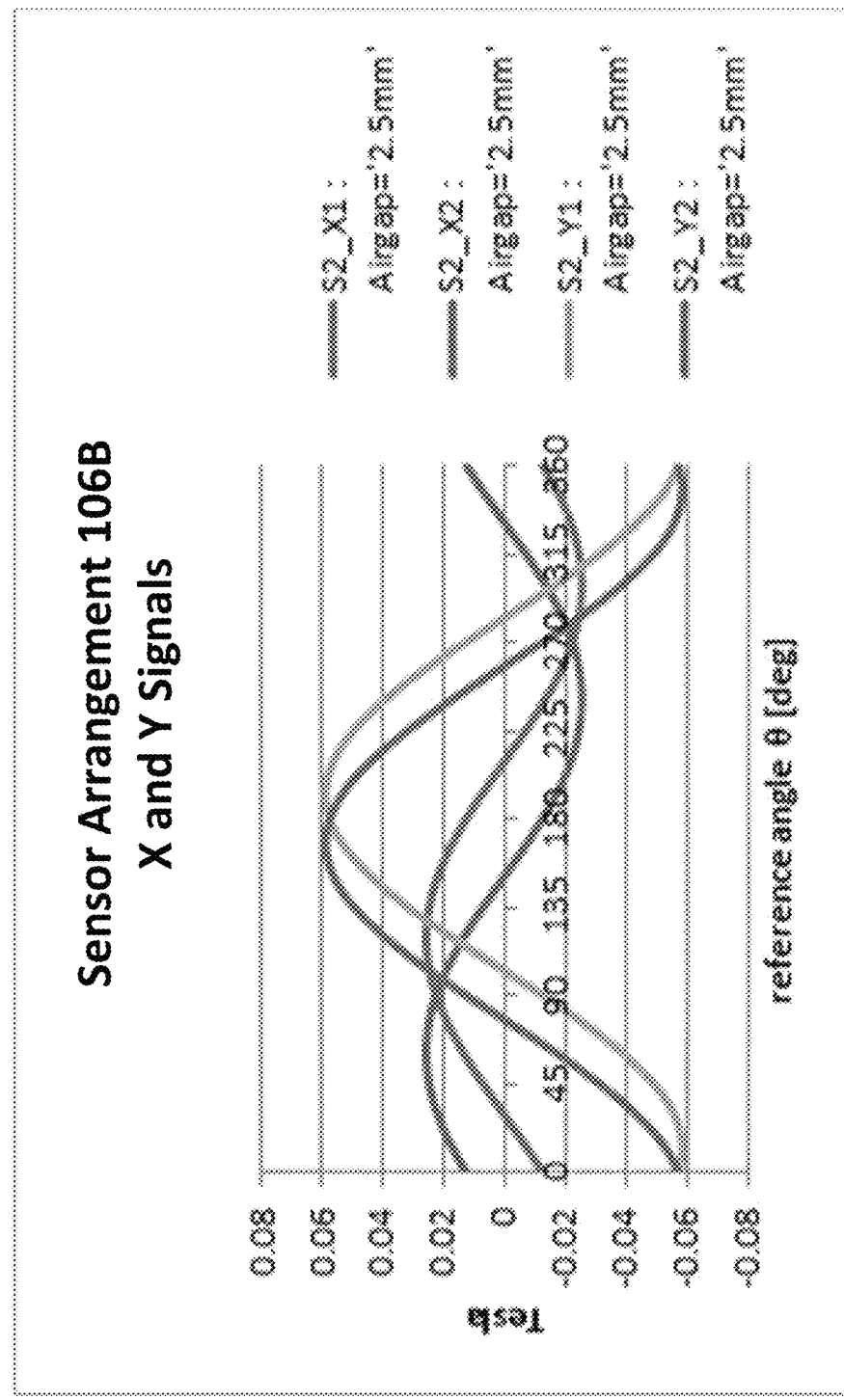
FIGS. 5A-5C illustrate simulation measurements associated with the second OoS sensor arrangement (OoS sensor 2) corresponding to the simulation model as shown in FIG. 3, in accordance with an embodiment of the disclosure.
Figure 5B:
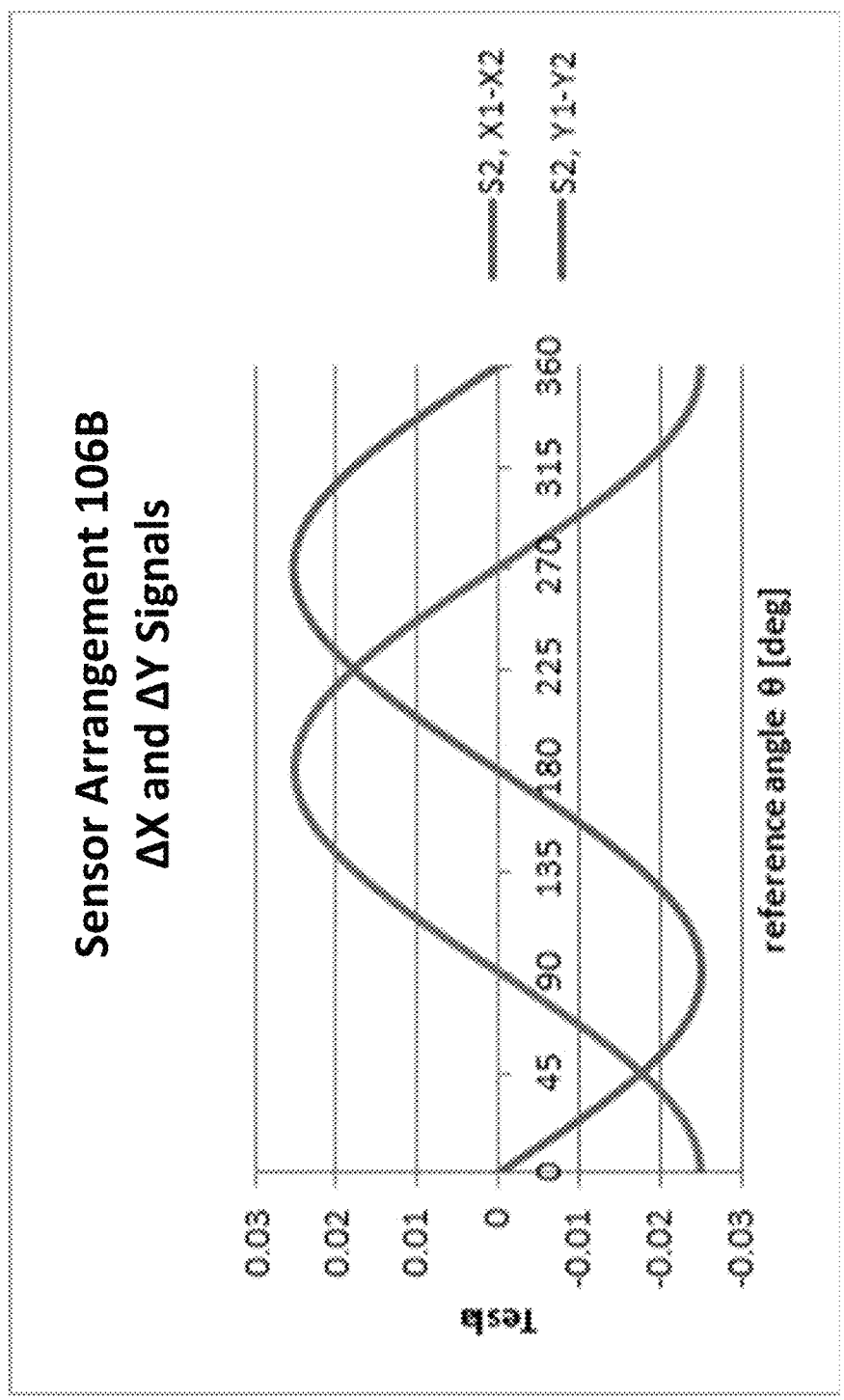
Figure 5C:
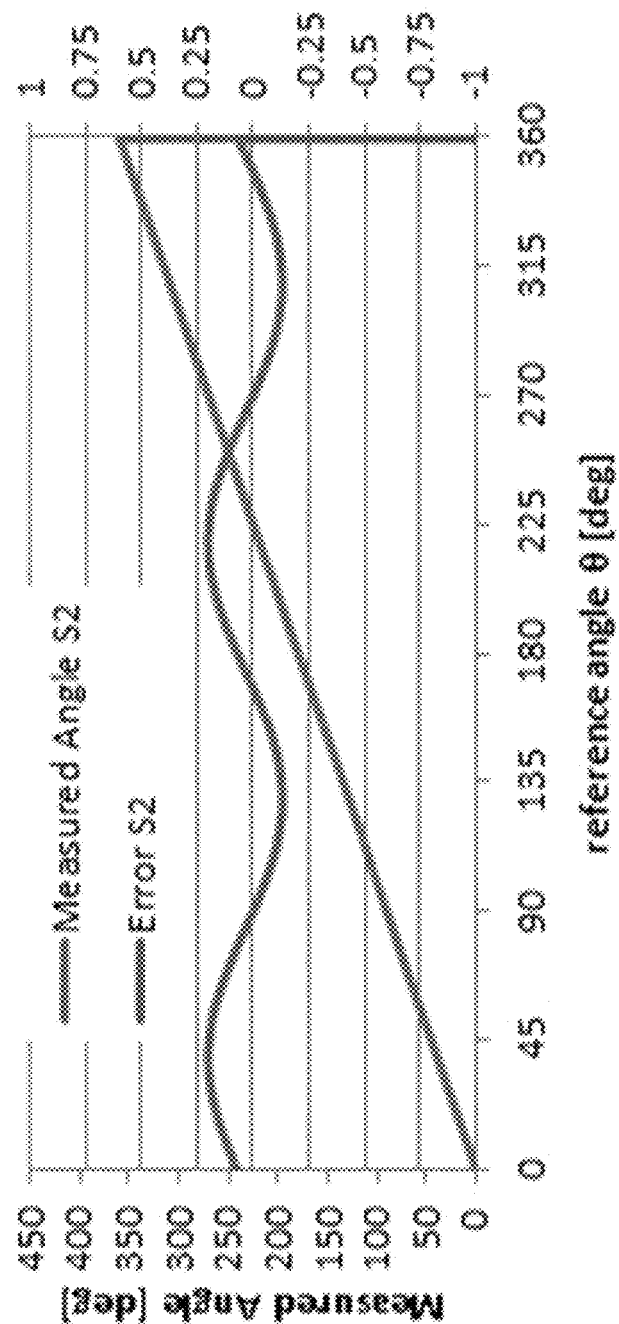

To demonstrate the use of additional magnetic field component measurements to reduce the measurement error, the simulated measurements as shown in FIGS. 5A-5C are repeated for the second sensor as shown in FIG. 4, which is identified with the magnetic sensors 106.3, 106.4 in this example, as shown in FIG. 2. These simulated measurements are illustrated as shown in FIGS. 5A-5C.

Figure 6:
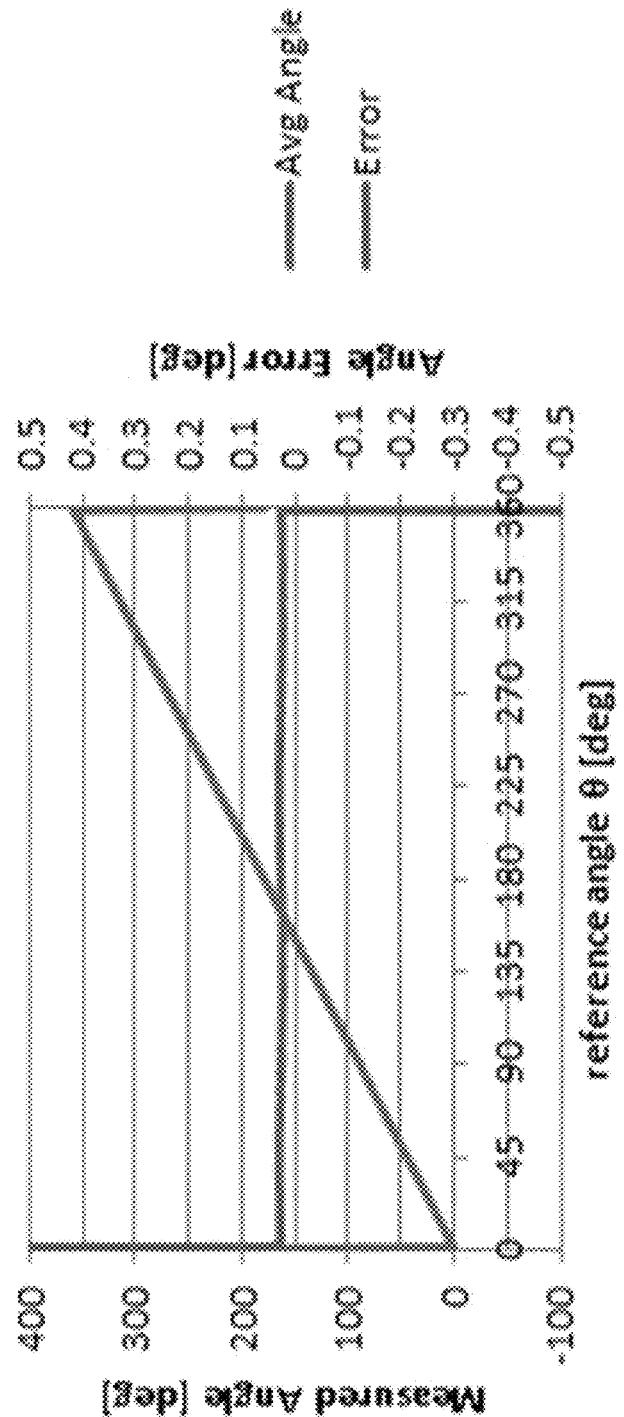
FIG. 6 illustrates simulation measurements associated with the first and the second OoS sensor arrangement corresponding to the simulation model as shown in FIG. 3, in accordance with an embodiment of the disclosure.

FIG. 6 illustrates the simulation measurements associated with the use of two different magnetic sensor pairs as shown in FIG. 2. In particular, FIG. 6 illustrates a mean angle measurement calculated from the measurements of each of the sensor pairs (i.e. magnetic sensors 106.1, 106.2 and 106.3, 106.4) as shown in FIG. 2 and simulated in FIG. 3. FIG. 6 also illustrates an angle error associated with the average angle measurement. As can be seen from FIG. 6, introducing an additional sensor pair to the system as shown in FIG. 2 results in the obtained angle error curve of one sensor pair (as shown in FIG. 5C), which is shifted by 90 degrees with respect to the obtained angle error curve of the other sensor pair (as shown in FIG. 4C), cancelling one another. Thus, by calculating the average angle (mean value of the measured angle from magnetic sensors 106.1, 106.2 and the measured angle from magnetic sensors 106.3, 106.4), the angle error cancels out. It should be noted that the simulated measurements shown in FIGS. 4A-4C, 5A-5C, and 6 illustrate that the embodiments described herein obviate the need for additional calibration of the magnetic signals (e.g. such as amplitude normalization), as the stray field robust differential signals have equally-sized amplitudes and are orthogonal to one another.

Magnetic Sensor Configurations—Different Radial Distances

For the previous embodiments as described with reference to FIGS. 1A-1B, 2, and 3, each of the magnetic sensors 106.1-106.N was positioned an equal radial distance 'r' from the rotation axis 120 of the rotatable shaft 104. This configuration allows for the calculations to determine the angle of the rotatable shaft 104 to be simplified, although such a configuration is not always possible. For example, physical constraints for a particular application may prevent one or more of the magnetic sensors 106.1-106.N from being arranged in this manner. Thus, the following embodiments discussed below are directed to an alternate configuration in which the magnetic sensors that form each respective sensor arrangement are positioned a different radial distance 'r' from the rotation axis 120 of the rotatable shaft 104, but at the same angular position.

An example of such a configuration is shown in FIGS. 7A-7B. The OoS sensor system 700 is shown in FIG. 7A-7B with a top view in FIG. 7A and a side view in FIG. 7B. The OoS sensor system 700 includes similar sensor components as the OoS sensor system 100 described above with reference to FIGS. 1A-1B. Therefore, only differences between the OoS sensor system 100 and the OoS sensor system 700 are further described herein.

For instance, the OoS sensor system 700 also includes the magnetic ring 102 that is fixedly mounted to the rotatable shaft 104. The OoS sensor system 700 also includes a pair of magnetic sensors 706.1, 706.2, which may be identical to and/or implemented in the same manner as the magnetic sensors 106.1, 106.2 as discussed above with respect to FIGS. 2A-2B. Thus, the magnetic sensors 706.1, 706.2 also form part of a magnetic sensor arrangement 706, which is parallel to the X-Y plane and perpendicular to the axis of rotation of the rotatable shaft 104. Thus, the magnetic sensor arrangement 706 is arranged in a similar manner as the magnetic sensor arrangement 106 as shown in FIGS. 1A-1B, with each magnetic sensor 706.1, 706.2 also including a magnetic sensor element to measure the magnetic field components of the magnetic field generated by the magnetic ring 102 in the X direction (X1, X2) and the Y direction (Y1, Y2).

However, in contrast to the OoS sensor system 100, the magnetic sensors 706.1, 706.2 of the OoS sensor system 700 are positioned a different radial distance from the axis of rotation of the rotatable shaft 104. Specifically, in the present embodiments, the magnetic sensors 706.1, 706.2 are separated from one another by a spacing distance dxS (i.e. center-to-center), and located at different radial distances, dx1 and dx2 (i.e. from the center of each sensor magnetic sensor 706.1, 706.2), respectively, from the axis of rotation of the rotatable shaft 104. In accordance with the present embodiments, the smaller distance dx1 may preferably be relatively small (heeding mechanical tolerances), and dxS preferably large compared to dx1 (e.g. dxS may be 5 times dx1, 10 times, 50 times, etc.) This ensures that, in this example configuration, the magnetic sensors 706.1, 706.2 sense magnetic field components generated by the magnetic ring 102 of considerably different amplitudes.

As was noted above for the OoS sensor system 100, the sources of magnetic stray fields are preferably located significantly further apart from the magnetic sensors 706.1, 706.2 (a distance Δx). Again, as long as Δx>>dxS, both the magnetic sensors 706.1, 706.2 will sense virtually the same stray field components. As was explained above with respect to the OoS sensor system 100 and discussed in further detail below, the present embodiments also include subtracting the output signals generated by the magnetic sensor 706.1 from the output signals generated by the magnetic sensor 706.2, once again generating stray field robust signals of the magnetic field components generated by the magnetic ring 102. Furthermore, and as explained above, these stray field robust signals may be used to calculate the angular position of the magnetic ring 102 (and thus the angular position of the rotatable shaft 104).

To do so, the present embodiments apply the same equations 1-3 as noted above for the OoS sensor system 100 to obtain the stray-field robust differential signals ΔX(θ), ΔY(θ), which represent respective magnetic field component values as a function of the angle of the rotatable shaft 104. For clarity, Equation 3 is reproduced below.

$$\Delta X(\theta)=X1(\theta)-X2(\theta)=Sx\cdot(A_{X1}-A_{X2})\cdot\cos(\theta),$$

$$\Delta Y(\theta)=Y1(\theta)-Y2(\theta)=Sy\cdot(A_{Y1}-A_{Y2})\cdot\sin(\theta).\quad \text{Eqn. 3:}$$

However, because the magnetic sensors 706.1, 706.2 sense magnetic field components generated by the magnetic ring 102 of considerably different amplitudes, the stray-field robust differential signals ΔX(θ), ΔY(θ) are divided and then multiplied by an appropriate matching factor k, which is represented below as Equation 3A.

$$k=Sx/Sy\cdot(A_{X1}-A_{X2})/(A_{Y1}-A_{Y2}).\quad \text{Eqn. 3A:}$$

The matching factor k thus represents a scaling factor that is applied to the magnetic field component measurements to compensate for the different amplitude measurements sensed by the magnetic sensors 706.1, 706.2 due to the different distances, dx1 and dx2, respectively, of the magnetic sensors 706.1, 706.2 from the axis of rotation of the rotatable shaft 104. The matching factor k may be determined via any suitable techniques, which may include magnetic simulations, in-system calibration, testing during manufacturing and/or configuration of the OoS sensor system 700, etc. In any event, the matching factor k is considered to be known a priori, and the present embodiments include multiplying the ratio of the stray-field robust differential signals ΔX(θ), ΔY(θ) by the matching factor k as indicated by Equation 3B below.

$$k\cdot\frac{\Delta Y(\theta)}{\Delta X(\theta)}=\frac{Sx\cdot(A_{X1}-A_{X2})}{Sy\cdot(A_{Y1}-A_{Y2})}\cdot\frac{Sy\cdot(A_{Y1}-A_{Y2})\cdot\sin(\theta)}{Sx\cdot(A_{X1}-A_{X2})\cdot\cos(\theta)}=\tan(\theta).\quad \text{Eqn. 3B}$$

Again, as noted above for the OoS sensor systems 100, once the matching factor k is applied, these stray-field robust differential signals are considered to have the same amplitude, but are phase-shifted by 90 degrees. Therefore, embodiments include determining the angle θ of the rotatable shaft 104 by calculating the arctangent of a ratio of the stray-field robust differential signals ΔX(θ), ΔY(θ) multiplied by the matching factor k, as noted above in Equation 3B, which is represented below in Equation 4A.

$$\theta=\operatorname{atan}\!\left(k\cdot\frac{\Delta Y(\theta)}{\Delta X(\theta)}\right)\!.\quad \text{Eqn. 4A}$$

In this way, the embodiments described herein function to calculate the angular position θ of the rotatable shaft 104 using the values of the output signals of the magnetic sensors 706.1, 706.2. However, and as discussed above with reference to the OoS sensor system 100, to further reduce the angle error of the overall system, additional sensor arrangements 706 may be implemented. For example, FIG. 8 illustrates an OoS sensor system 800, which is similar to the OoS sensor system 700 as shown in FIG. 7A-7B, but uses a second magnetic sensor arrangement 706B, which is identical or substantially similar as the magnetic sensor arrangement 706 as shown and discussed herein with reference to FIGS. 7A-7B, which has been relabeled in FIG. 8 as 706A for clarity. Thus, the magnetic sensor arrangement 706B also includes two magnetic sensors 706.3, 706.4, each including a magnetic sensor element configured to measure values of magnetic field strength of the X and Y magnetic field components generated by the magnetic ring 102.

As noted above, although four magnetic sensors 706.1-706.4 are shown in FIG. 7, the embodiments described herein are not limited to this particular example, and any suitable number of additional magnetic sensors 706 may be used to calculate the angle of the rotatable shaft 104. Moreover, in accordance with the present embodiments, regardless of the number of magnetic sensors that are implemented, the data used to determine the angle of the rotatable shaft 104 is processed in terms of pairs of the magnetic sensors 706.1-706.N, with the signals representing the values of the strength of the measured magnetic field components being processed for each magnetic sensor pair in the same manner as discussed above with reference to the magnetic sensors 706.1, 706.2.

Further, and similar to the OoS sensor system 200 described above, the present embodiments also include each pair of magnetic sensors from among the magnetic sensors 706.1-706.N being disposed about the rotation axis of the rotatable shaft 104 in a specific manner to maintain measurement symmetry. For instance, regardless of the number of magnetic sensors 706.1-706.N that are implemented, the magnetics sensors 706 associated with each respective sensor arrangement 706 (e.g., 706A, 706B), are positioned at the same angular position with respect to the axis of rotation of the rotatable shaft 104, as shown in FIG. 8. For example, each of the magnetic sensors 706.1, 706.2 is arranged in line with one another at the same angular position with respect to the axis of rotation of the rotatable shaft 104, and each of the magnetic sensors 706.3, 706.4 is likewise arranged line with one another at the same angular position with respect to the axis of rotation of the rotatable shaft 104.

However, magnetic sensors 706 associated with different sensor arrangements are arranged at different angular positions with respect to the rotation axis of the rotatable shaft 104, which may be explained for ease of explanation with respect to the central axes 810A, 810B. For example, as shown in FIG. 8, the magnetic sensors 706.1, 706.2 form part of the sensor arrangement 706A, which is disposed 90 degrees from the sensor arrangement 706B. In other words, the central axes 810A, 810B are disposed 90 degrees apart from one another.

Furthermore, to maintain measurement symmetry, the present embodiments include corresponding magnetic sensors 706.1-706.N for each respective magnetic sensor arrangement being disposed the same radial distance from the axis of rotation of the rotatable shaft 104. For example, with reference to FIG. 8, the present embodiments include the magnetic sensor 706.3 being positioned from the axis of rotation of the rotatable shaft 104 the same distance dx1 as the magnetic sensor 706.1, whereas the magnetic sensor 706.4 is positioned from the axis of rotation of the rotatable shaft 104 the same distance dx2 as the magnetic sensor 706.2.

As discussed above with reference to the OoS sensor system 200 as shown in FIG. 2, the central axes 810A, 810B likewise function to bisect the sensor arrangements 706A, 706B (albeit in the longitudinal direction in this example) such that equal portions of the sensor elements X1, X2, Y1, Y2 is disposed 90 degrees from the sensor arrangement 706B. For instance, the central axis 810A extends along the X-axis from the center of the axis of rotation of the rotatable shaft 104 and is thus perpendicular to the axis of rotation of the rotatable shaft 104. The central axis 810A thus bisects the magnetic sensor arrangement 706A into two equal and symmetric portions, with the pairs of magnetic sensors 706.1, 706.2 being symmetrically disposed such that, in the example shown in FIG. 8, the magnetic sensors 706.1, 706.2 are bisected about the central axis 810A such that equal portions of each of the X1, Y1, X2, and Y2 sensor elements is are above and below the central axis 810A in the +Y and −Y directions.

Likewise, the geometric configuration of the magnetic sensors 706.1, 706.2 associated with the magnetic sensor configuration 706A also applies to the magnetic sensors 706.3, 706.4 associated with the magnetic sensor configuration 706B, as well as any additional pairs of magnetic sensors 706.5-706.N that may be implemented, in accordance with the present embodiments. For instance, the central axis 810B extends along the Y-axis from the center of the axis of rotation of the rotatable shaft 104 and is thus perpendicular to the axis of rotation of the rotatable shaft 104. The central axis 810B bisects the magnetic sensor arrangement 706B into two equal and symmetric portions, with the pairs of magnetic sensors 706.3, 706.4 being symmetrically disposed such that, in the example shown in FIG. 8, the magnetic sensors 706.3, 706.4 are bisected about the central axis 810B such that an equal portion of each of the X1, Y1, X2, and Y2 sensor elements is disposed to the left and right of the central axis 910B in the +X and −X directions.

As described above for the OoS sensor systems 100, 200, the angular separation between each magnetic sensor arrangement (e.g., 706A, 706B) for the OoS sensor system 700 may also be a function of the number of poles associated with a particular implementation of the magnetic ring 102. That is, in the example shown in FIG. 8 in which the magnetic ring 102 has two poles (P=2), the magnetic sensors 706.1, 706.2 and 706.3, 706.4 associated with the sensor arrangements 706A, 706B should be positioned a quarter of a complete revolution of the rotatable shaft 104 to ensure that measurement errors are reduced as a result of each magnetic sensor pair measuring complementary magnetic field components (i.e. the X1 sensor element of the magnetic sensor 706.3 measures the magnetic field component corresponding to that measured by the Y1 sensor element of the magnetic sensor 706.1). This relationship may hold true as additional magnetic sensor pairs 706.5-706.N are implemented. In other words, in present embodiments, the angle between different sets of the adjacent magnetic sensors 106.1-106.N associated with different sensor arrangements (e.g., the angle between the respective central axes 810A, 810B symmetrically bisecting each magnetic sensor arrangement as shown in FIG. 8) may be expressed as 180 degrees/P, with P being equal to a number of poles of the magnetic ring 102.

Figure 9A:
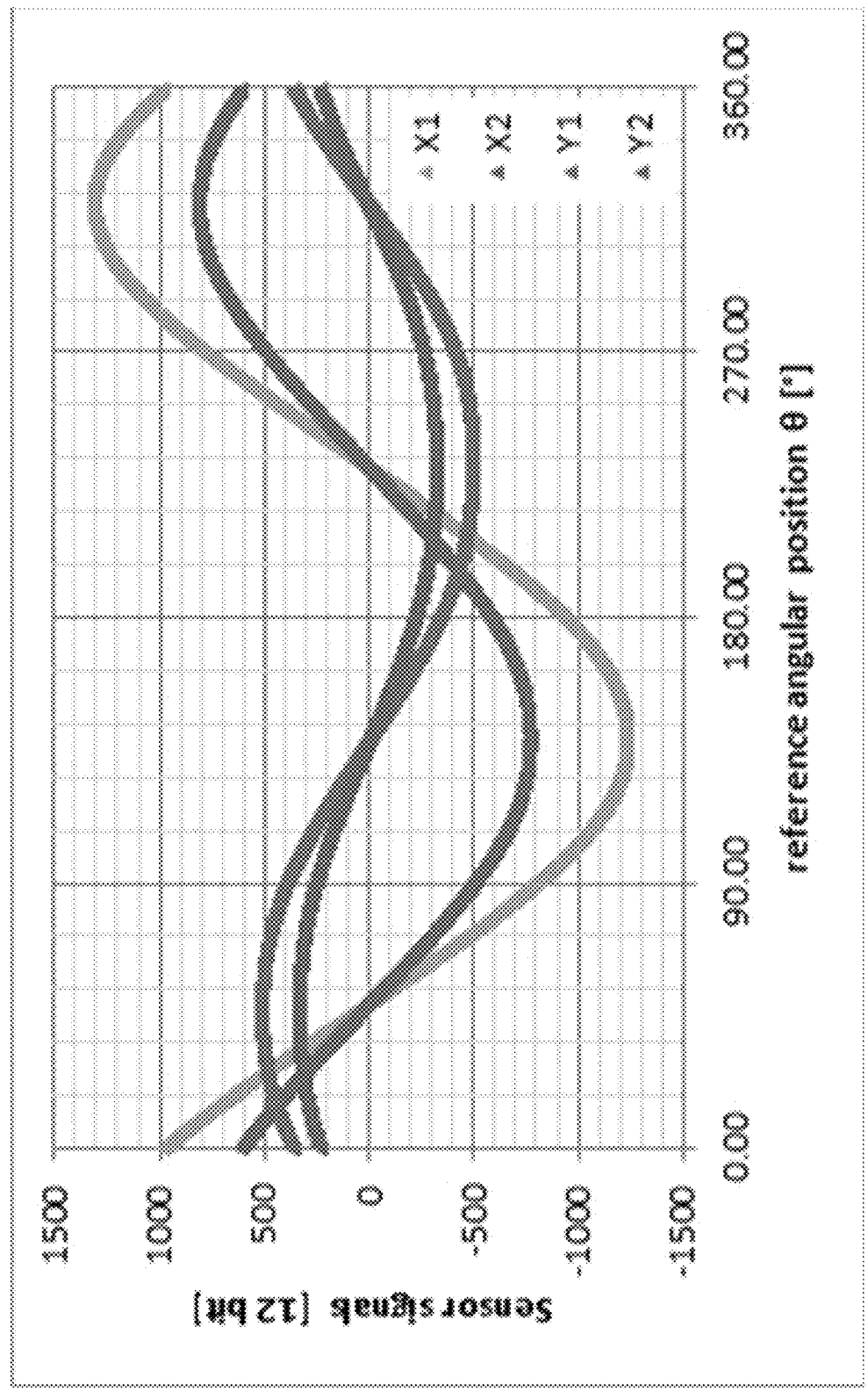
FIGS. 9A-9C illustrate simulation measurements associated with the second Out of Shaft (OoS) sensor system configuration, in accordance with an embodiment of the disclosure.
Figure 9B:
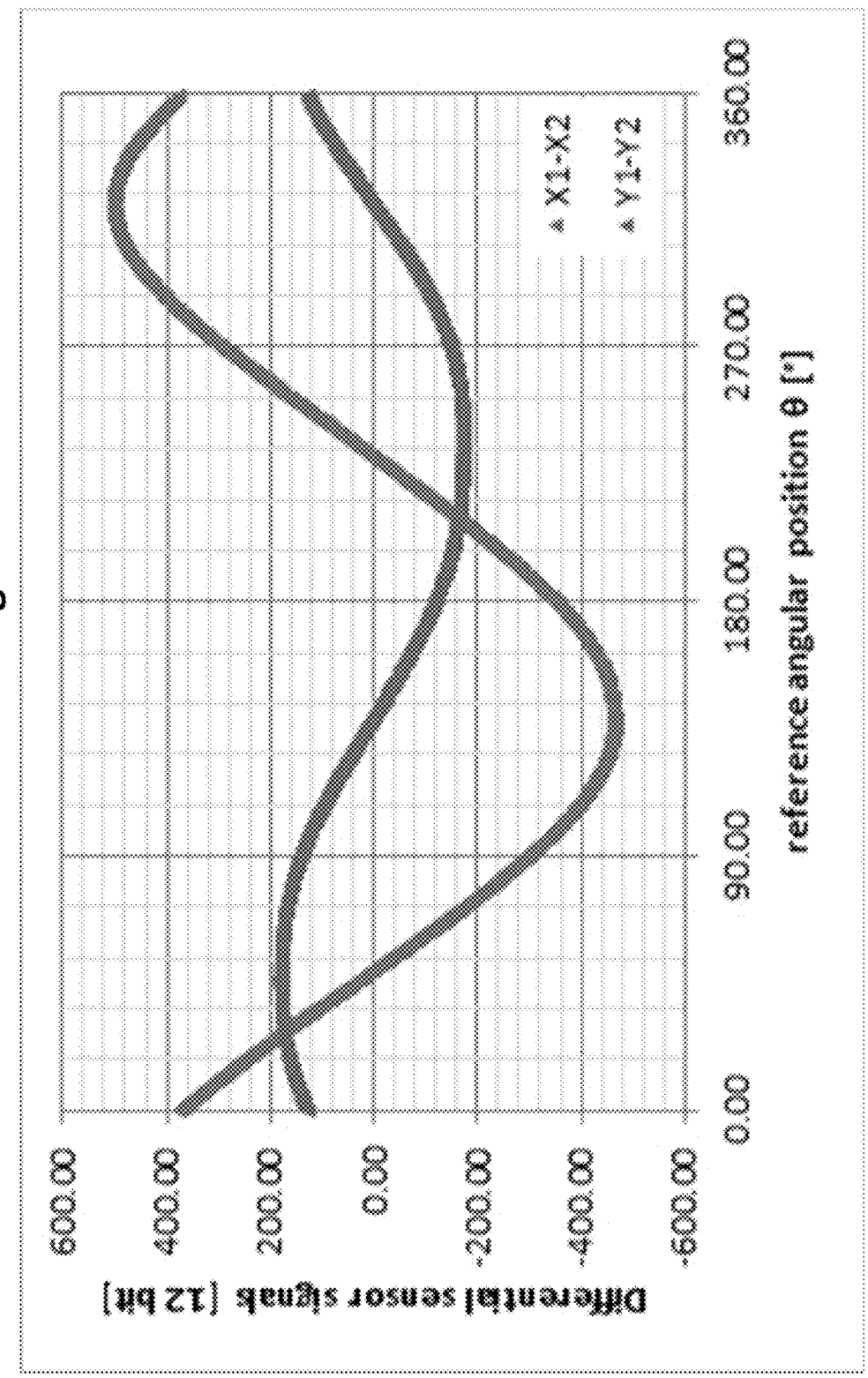
Figure 9C:
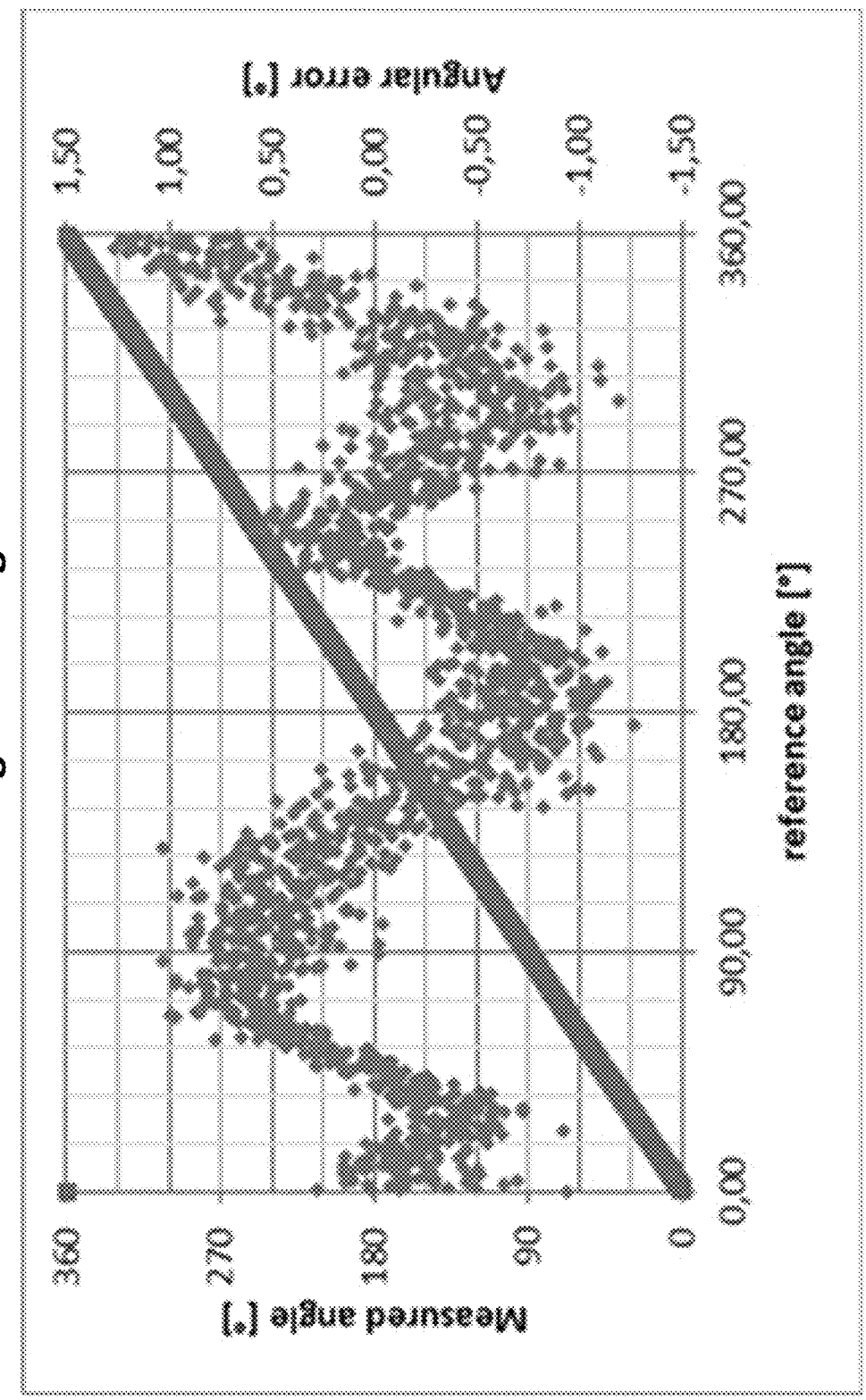

For clarity and ease of explanation, FIGS. 9A-9C illustrate the results of measurements produced via a simulation model of the Out of Shaft (OoS) sensor system configuration as shown in FIGS. 7A-7B, in accordance with an embodiment of the disclosure. The simulation was constructed using magnetic FE simulations in ANSYS Maxwell 3D, similar to the simulations performed above with respect to the OoS sensor system 300 as shown in FIG. 3. For brevity, the example simulation model is not shown, although the simulation was performed using magnetic OoS measurements by modeling each magnetic sensor element of the magnetic sensor arrangement 706 as 3D Hall sensors as function of the reference (i.e. pre-set) angular position of the rotating shaft θ, and with varying spacings for dx1 and dz, as shown in FIGS. 7A-7B. An exemplary result of these measurements is shown in FIG. 9A. A minimal offset and orthogonality compensation was applied to the sensor data, and from these measurements the stray field robust intermediate quantities $\Delta X(\theta)=X1-X2$ and $\Delta Y(\theta)=Y1-Y2$ are derived at two different spacings dx1 as a function of the reference angular shaft position θ of the rotatable shaft 104, as shown in FIG. 9B. From these stray field robust intermediate quantities ΔX(θ), ΔY(θ), the angular position θ is then calculated, as shown in FIG. 9C.

Figure 10:
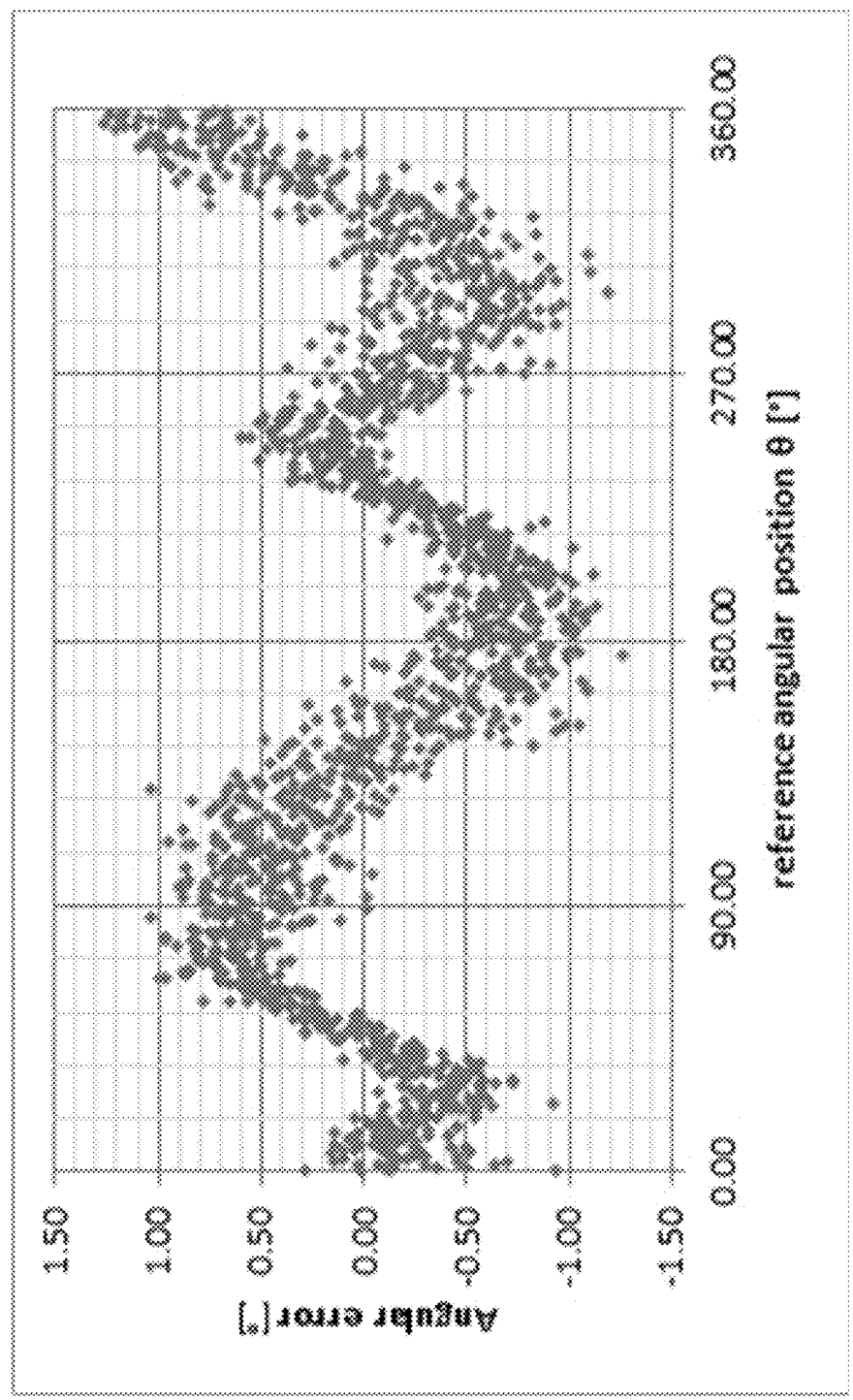
FIG. 10 illustrates the error of the reconstructed angular position as a function of angular position θ, in accordance with an embodiment of the disclosure.

FIG. 10 illustrates the error of the reconstructed angular position of the rotatable shaft 104 as a function of angular position θ. As discussed above with respect to the OoS sensor system 100, the error of the reconstructed angular position of the rotatable shaft 104 may be further reduced via the introduction of one or more additional sensor arrangements, with the angle obtained from each sensor arrangement being used to calculate an average angle, as discussed with respect to FIG. 8.

EXAMPLES

The techniques of this disclosure may also be described in the following examples.

Example 1. An angle sensing device, comprising: a first magnetic sensor configured to generate at least two first signals associated with a measurement of a first magnetic field component and a second magnetic field component of a magnetic field generated by a magnetic ring mounted to a rotatable shaft having a rotation axis; a second magnetic sensor configured to generate at least two second signals associated with a measurement of the first magnetic field component and the second magnetic field component of the magnetic field generated by the magnetic ring; and a circuit configured to: determine a first value indicative of a difference between the first magnetic field component represented by one of the at least two first signals and the first magnetic field component represented by one of the at least two second signals, determine a second value indicative of a difference between the second magnetic field component represented by another one of the at least two first signals and the second magnetic field component represented by another one of the at least two second signals, and determine, based on the first value and the second value, an angle of the rotatable shaft having a reduced stray-field influence, wherein the first magnetic field component, the second magnetic field component, and the rotation axis of the rotatable shaft are perpendicular to each other, and wherein the first magnetic sensor and the second magnetic sensor are positioned an equal radial distance from the rotation axis and at different angular positions with respect to the rotation axis.

Example 2. The angle sensing device of Example 1, further comprising: a third magnetic sensor configured to generate at least two third signals associated with a measurement of the first magnetic field component and the second field component of the magnetic field generated by the magnetic ring; a fourth magnetic sensor configured to generate at least two fourth signals associated with a measurement of the first magnetic field component and the second magnetic field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis, and wherein each of the first magnetic sensor, the second magnetic sensor, the third magnetic sensor, and the fourth magnetic sensor are positioned an equal radial distance from the rotation axis and at different angular positions with respect to the rotation axis.

Example 3. The angle sensing device of any combination of Examples 1-2, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

Example 4. The angle sensing device of any combination of Examples 1-3, wherein the circuit is further configured to: determine a third value indicative of a difference between the first magnetic field component represented by one of the at least two third signals and the first magnetic field component represented by one of the at least two fourth signals, determine a fourth value indicative of a difference between the second magnetic field component represented by another one of the at least two third signals and the second magnetic field component represented by another one of the at least two fourth signals, and determine, based on the first value, the second value, the third value, and the fourth value, the angle of the rotatable shaft having a reduced stray-field influence.

Example 5. A method, comprising: generating, via a first magnetic sensor, at least two first signals associated with a measurement of a first magnetic field component and a second magnetic field component of a magnetic field generated by a magnetic ring mounted to a rotatable shaft having a rotation axis; generating, via a second magnetic sensor, at least two second signals associated with a measurement of the first magnetic field component and the second magnetic field component of the magnetic field generated by the magnetic ring; calculating a first value indicative of a difference between the first magnetic field component represented by one of the at least two first signals and the first magnetic field component represented by one of the at least two second signals; calculating a second value indicative of a difference between the second magnetic field component represented by another one of the at least two first signals and the second magnetic field component represented by another one of the at least two second signals; and determining, based on the first value and the second value, an angle of the rotatable shaft having a reduced stray-field influence, wherein the first magnetic field component, the second magnetic field component, and the rotation axis of the rotatable shaft are perpendicular to each other, and wherein the first magnetic sensor and the second magnetic sensor are positioned an equal radial distance from the rotation axis and at different angular positions with respect to the rotation axis.

Example 6. The method of Example 5, wherein the act of calculating the angle of the rotatable shaft comprises calculating an arctangent of a ratio of the first value and the second value.

Example 7. The method of any combination of Examples 5-6, further comprising: generating, via a third magnetic sensor, at least two third signals associated with a measurement of the first magnetic field component and the second field component of the magnetic field generated by the magnetic ring; generating, via a fourth magnetic sensor, at least two fourth signals associated with a measurement of the first magnetic field component and the second field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis, wherein each of the first magnetic sensor, the second magnetic sensor, the third magnetic sensor, and the fourth magnetic sensor are positioned an equal radial distance from the rotation axis and at different angular positions with respect to the rotation axis.

Example 8. The method of any combination of Examples 5-7, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

Example 9. The method of any combination of Examples 5-8, further comprising: calculating a third value indicative of a difference between the first magnetic field component represented by one of the at least two third signals and the first magnetic field component represented by one of the at least two fourth signals; calculating a fourth value indicative of a difference between the second magnetic field component represented by another one of the at least two third signals and the second magnetic field component represented by another one of the at least two fourth signals; and determining, based on the first value, the second value, the third value, and the fourth value, the angle of the rotatable shaft having a reduced stray-field influence.

Example 10. An angle sensing device, comprising: a first magnetic sensor configured to generate at least two first signals associated with a measurement of a first magnetic field component and a second magnetic field component of a magnetic field generated by a magnetic ring mounted to a rotatable shaft having a rotation axis; a second magnetic sensor configured to generate at least two second signals associated with a measurement of the first magnetic field component and the second magnetic field component of the magnetic field generated by the magnetic ring; and a circuit configured to: determine a first value indicative of a difference between the first magnetic field component represented by one of the at least two first signals and the first magnetic field component represented by one of the at least two second signals, determine a second value indicative of a difference between the second magnetic field component represented by another one of the at least two first signals and the second magnetic field component represented by another one of the at least two second signals, and determine, based on the first value and the second value, an angle of the rotatable shaft having a reduced stray-field influence, wherein the first magnetic field component, the second magnetic field component, and the rotation axis of the rotatable shaft are perpendicular to each other, and wherein the first magnetic sensor and the second magnetic sensor are positioned at different radial distances from the rotatable shaft and a same angular position with respect to the rotation axis.

Example 11. The angle sensing device of Example 10, wherein: the first magnetic sensor and the second magnetic sensor are spaced apart from one another by a spacing distance, the first magnetic sensor is positioned a first radial distance from the rotatable shaft, the first the first magnetic sensor being closer to the rotatable shaft than the second magnetic sensor, and the spacing distance is greater than the first radial distance.

Example 12. The angle sensing device of any combination of Examples 10-11, further comprising: a third magnetic sensor configured to generate at least two third signals associated with a measurement of the first magnetic field component and the second magnetic field component of the magnetic field generated by the magnetic ring; a fourth magnetic sensor configured to generate at least two fourth signals associated with a measurement of the first magnetic field component and the second magnetic field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis.

Example 13. The angle sensing device of any combination of Examples 10-12, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

Example 14. The angle sensing device of any combination of Examples 10-13, wherein: the first magnetic sensor and the third magnetic sensor are each positioned a first radial distance from the rotatable shaft and at different angular positions with respect to the rotation axis, and the second magnetic sensor and the fourth magnetic sensor are positioned a second radial distance from the rotatable shaft and at different angular positions with respect to the rotation axis, and the first radial distance and the second radial distance are different.

Example 15. The angle sensing device of any combination of Examples 10-14, wherein the circuit is further configured to: determine a third value indicative of a difference between the first magnetic field component represented by one of the at least two third signals and the first magnetic field component represented by one of the at least two fourth signals, determine a fourth value indicative of a difference between the second magnetic field component represented by another one of the at least two third signals and the second magnetic field component represented by another one of the at least two fourth signals, and determine, based on the first value, the second value, the third value, and the fourth value, the angle of the rotatable shaft having a reduced stray-field influence.

Example 16. A method, comprising: generating, via a first magnetic sensor, at least two first signals associated with a measurement of a first magnetic field component and a second magnetic field component of a magnetic field generated by a magnetic ring mounted to a rotatable shaft having a rotation axis; generating, via a second magnetic sensor, at least two second signals associated with a measurement of the first magnetic field component and the second magnetic field component of the magnetic field generated by the magnetic ring; calculating a first value indicative of a difference between the first magnetic field component represented by one of the at least two first signals and the first magnetic field component represented by one of the at least two second signals; calculating a second value indicative of a difference between the second magnetic field component represented by another one of the at least two first signals and the second magnetic field component represented by another one of the at least two second signals; and determining, based on the first value and the second value, an angle of the rotatable shaft having a reduced stray-field influence, wherein the first magnetic field component, the second magnetic field component, and the rotation axis of the rotatable shaft are perpendicular to each other, and wherein the first magnetic sensor and the second magnetic sensor are positioned at different radial distances from the rotatable shaft and a same angular position with respect to the rotation axis.

Example 17. The method of Example 16, wherein: the first magnetic sensor and the second magnetic sensor are spaced apart from one another by a spacing distance, the first magnetic sensor is positioned a first radial distance from the rotatable shaft, the first the first magnetic sensor being closer to the rotatable shaft than the second magnetic sensor, and the spacing distance is greater than the first radial distance.

Example 18. The method of any combination of Examples 16-17, further comprising: generating, via a third magnetic sensor, at least two third signals associated with a measurement of the first magnetic field component and the second magnetic field component of the magnetic field generated by the magnetic ring; generating, via a fourth magnetic sensor, at least two fourth signals associated with a measurement of the first magnetic field component and the second magnetic field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis.

Example 19. The method of any combination of Examples 16-18, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

Example 20. The method of any combination of Examples 16-19, wherein: the first magnetic sensor and the third magnetic sensor are each positioned a first radial distance from the rotatable shaft and at different angular positions with respect to the rotation axis, the second magnetic sensor and the fourth magnetic sensor are positioned a second radial distance from the rotatable shaft and at different angular positions with respect to the rotation axis, and the first radial distance and the second radial distance are different.

Example 21. The method of any combination of Examples 16-20, further comprising: calculating a third value indicative of a difference between the first magnetic field component represented by one of the at least two third signals and the first magnetic field component represented by one of the at least two fourth signals; calculating a fourth value indicative of a difference between the second magnetic field component represented by another one of the at least two third signals and the second magnetic field component represented by another one of the at least two fourth signals; and determining, based on the first value, the second value, the third value, and the fourth value, the angle of the rotatable shaft having a reduced stray-field influence.

Example 22. The method of any combination of Examples 16-21, wherein the act of calculating the angle of the rotatable shaft comprises: multiplying a ratio of the first value and the second value by a matching factor k to yield a scaled ratio; and calculating an arctangent of the scaled ratio.

CONCLUSION

Although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

It is further to be noted that specific terms used in the description and claims may be interpreted in a very broad sense. For example, the terms "circuit" or "circuitry" used herein are to be interpreted in a sense not only including hardware but also software, firmware or any combinations thereof. The term "data" may be interpreted to include any form of representation data. The term "information" may in addition to any form of digital information also include other forms of representing information. The term "entity" or "unit" may in embodiments include any device, apparatus circuits, hardware, software, firmware, chips, or other semiconductors as well as logical units or physical implementations of protocol layers etc. Furthermore the terms "coupled" or "connected" may be interpreted in a broad sense not only covering direct but also indirect coupling.

It is further to be noted that methods disclosed in the specification or in the claims may be implemented by a device having means for performing each of the respective steps of these methods.

Although specific embodiments have been illustrated and described herein, it will be appreciated by those of ordinary skill in the art that a variety of alternate and/or equivalent implementations may be substituted for the specific embodiments shown and described without departing from the scope of the present disclosure. This disclosure is intended to cover any adaptations or variations of the specific embodiments discussed herein.

What is claimed is:

1. An angle sensing device, comprising:
 a first magnetic sensor configured to generate at least two first signals associated with a measurement of a first magnetic field component and a second magnetic field component of a magnetic field generated by a magnetic ring mounted to a rotatable shaft having a rotation axis;
 a second magnetic sensor configured to generate at least two second signals associated with a measurement of the first magnetic field component and the second magnetic field component of the magnetic field generated by the magnetic ring; and
 a circuit configured to:
  determine a first value indicative of a difference between the first magnetic field component represented by one of the at least two first signals and the first magnetic field component represented by one of the at least two second signals,
  determine a second value indicative of a difference between the second magnetic field component represented by another one of the at least two first signals and the second magnetic field component represented by another one of the at least two second signals, and determine, based on the first value and the second value, an angle of the rotatable shaft having a reduced stray-field influence, wherein the first magnetic field component, the second magnetic field component, and the rotation axis of the rotatable shaft are perpendicular to each other, wherein the first magnetic sensor and the second magnetic sensor are positioned an equal radial distance from the rotation axis and at different angular positions with respect to the rotation axis, and wherein the first magnetic sensor comprises a first magnetic sensor element and a second magnetic sensor element that overlap with one another at a center of the first magnetic sensor, and the second magnetic sensor comprises a third magnetic sensor element and a fourth magnetic sensor element that overlap with one another at a center of the second magnetic sensor.

2. The angle sensing device of claim 1, further comprising:

a third magnetic sensor configured to generate at least two third signals associated with a measurement of the first magnetic field component and the second field component of the magnetic field generated by the magnetic ring;

a fourth magnetic sensor configured to generate at least two fourth signals associated with a measurement of the first magnetic field component and the second magnetic field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis, and wherein each of the first magnetic sensor, the second magnetic sensor, the third magnetic sensor, and the fourth magnetic sensor are positioned an equal radial distance from the rotation axis and at different angular positions with respect to the rotation axis.

3. The angle sensing device of claim 2, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

4. The angle sensing device of claim 3, wherein the circuit is further configured to:

determine a third value indicative of a difference between the first magnetic field component represented by one of the at least two third signals and the first magnetic field component represented by one of the at least two fourth signals, determine a fourth value indicative of a difference between the second magnetic field component represented by another one of the at least two third signals and the second magnetic field component represented by another one of the at least two fourth signals, and determine, based on the first value, the second value, the third value, and the fourth value, the angle of the rotatable shaft having a reduced stray-field influence.

5. The angle sensing device of claim 1, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and further comprising:

a third magnetic sensor and a fourth magnetic sensor associated with a second sensor arrangement having a second central axis that bisects the third magnetic sensor and the fourth magnetic sensor and is perpendicular to the rotation axis, wherein each of the first magnetic sensor, the second magnetic sensor, the third magnetic sensor, and the fourth magnetic sensor are positioned an equal radial distance from the rotation axis and at different angular positions with respect to the rotation axis.

6. A method, comprising:

generating, via a first magnetic sensor, at least two first signals associated with a measurement of a first magnetic field component and a second magnetic field component of a magnetic field generated by a magnetic ring mounted to a rotatable shaft having a rotation axis;

generating, via a second magnetic sensor, at least two second signals associated with a measurement of the first magnetic field component and the second magnetic field component of the magnetic field generated by the magnetic ring;

calculating a first value indicative of a difference between the first magnetic field component represented by one of the at least two first signals and the first magnetic field component represented by one of the at least two second signals;

calculating a second value indicative of a difference between the second magnetic field component represented by another one of the at least two first signals and the second magnetic field component represented by another one of the at least two second signals; and determining, based on the first value and the second value, an angle of the rotatable shaft having a reduced stray-field influence, wherein the first magnetic field component, the second magnetic field component, and the rotation axis of the rotatable shaft are perpendicular to each other, wherein the first magnetic sensor and the second magnetic sensor are positioned an equal radial distance from the rotation axis and at different angular positions with respect to the rotation axis, and wherein the first magnetic sensor comprises a first magnetic sensor element and a second magnetic sensor element that overlap with one another at a center of the first magnetic sensor, and the second magnetic sensor comprises a third magnetic sensor element and a fourth magnetic sensor element that overlap with one another at a center of the second magnetic sensor.

7. The method of claim 6, wherein the act of calculating the angle of the rotatable shaft comprises calculating an arctangent of a ratio of the first value and the second value.

8. The method of claim 6, further comprising:

generating, via a third magnetic sensor, at least two third signals associated with a measurement of the first magnetic field component and the second field component of the magnetic field generated by the magnetic ring;

generating, via a fourth magnetic sensor, at least two fourth signals associated with a measurement of the first magnetic field component and the second field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis, wherein each of the first magnetic sensor, the second magnetic sensor, the third magnetic sensor, and the fourth magnetic sensor are positioned an equal radial distance from the rotation axis and at different angular positions with respect to the rotation axis.

9. The method of claim 8, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

10. The method of claim 8, further comprising:
calculating a third value indicative of a difference between the first magnetic field component represented by one of the at least two third signals and the first magnetic field component represented by one of the at least two fourth signals;
calculating a fourth value indicative of a difference between the second magnetic field component represented by another one of the at least two third signals and the second magnetic field component represented by another one of the at least two fourth signals; and
determining, based on the first value, the second value, the third value, and the fourth value, the angle of the rotatable shaft having a reduced stray-field influence.

11. An angle sensing device, comprising:
a first magnetic sensor configured to generate at least two first signals associated with a measurement of a first magnetic field component and a second magnetic field component of a magnetic field generated by a magnetic ring mounted to a rotatable shaft having a rotation axis;
a second magnetic sensor configured to generate at least two second signals associated with a measurement of the first magnetic field component and the second magnetic field component of the magnetic field generated by the magnetic ring; and
a circuit configured to:
determine a first value indicative of a difference between the first magnetic field component represented by one of the at least two first signals and the first magnetic field component represented by one of the at least two second signals,
determine a second value indicative of a difference between the second magnetic field component represented by another one of the at least two first signals and the second magnetic field component represented by another one of the at least two second signals, and
determine, based on the first value and the second value, an angle of the rotatable shaft having a reduced stray-field influence, wherein the first magnetic field component, the second magnetic field component, and the rotation axis of the rotatable shaft are perpendicular to each other, wherein the first magnetic sensor and the second magnetic sensor are positioned at different radial distances from the rotatable shaft and a same angular position with respect to the rotation axis, and wherein the first magnetic sensor comprises a first magnetic sensor element and a second magnetic sensor element that overlap with one another at a center of the first magnetic sensor, and the second magnetic sensor comprises a third magnetic sensor element and a fourth magnetic sensor element that overlap with one another at a center of the second magnetic sensor.

12. The angle sensing device of claim 11, wherein:
the first magnetic sensor and the second magnetic sensor are spaced apart from one another by a spacing distance,
the first magnetic sensor is positioned a first radial distance from the rotatable shaft, the first magnetic sensor being closer to the rotatable shaft than the second magnetic sensor, and
the spacing distance is greater than the first radial distance.

13. The angle sensing device of claim 11, further comprising:
a third magnetic sensor configured to generate at least two third signals associated with a measurement of the first magnetic field component and the second magnetic field component of the magnetic field generated by the magnetic ring;
a fourth magnetic sensor configured to generate at least two fourth signals associated with a measurement of the first magnetic field component and the second magnetic field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis.

14. The angle sensing device of claim 13, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

15. The angle sensing device of claim 13, wherein:
the first magnetic sensor and the third magnetic sensor are each positioned a first radial distance from the rotatable shaft and at different angular positions with respect to the rotation axis, and
the second magnetic sensor and the fourth magnetic sensor are positioned a second radial distance from the rotatable shaft and at different angular positions with respect to the rotation axis, and
the first radial distance and the second radial distance are different.

16. The angle sensing device of claim 13, wherein the circuit is further configured to:

determine a third value indicative of a difference between the first magnetic field component represented by one of the at least two third signals and the first magnetic field component represented by one of the at least two fourth signals, determine a fourth value indicative of a difference between the second magnetic field component represented by another one of the at least two third signals and the second magnetic field component represented by another one of the at least two fourth signals, and determine, based on the first value, the second value, the third value, and the fourth value, the angle of the rotatable shaft having a reduced stray-field influence.

17. The angle sensing device of claim 11, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and further comprising:

a third magnetic sensor and a fourth magnetic sensor associated with a second sensor arrangement having a second central axis that bisects the third magnetic sensor and the fourth magnetic sensor and is perpendicular to the rotation axis, wherein the third magnetic sensor and the fourth magnetic sensor are positioned at different radial distances from the rotatable shaft and a same angular position with respect to the rotation axis.

18. A method, comprising:

generating, via a first magnetic sensor, at least two first signals associated with a measurement of a first magnetic field component and a second magnetic field component of a magnetic field generated by a magnetic ring mounted to a rotatable shaft having a rotation axis;

generating, via a second magnetic sensor, at least two second signals associated with a measurement of the first magnetic field component and the second magnetic field component of the magnetic field generated by the magnetic ring;

calculating a first value indicative of a difference between the first magnetic field component represented by one of the at least two first signals and the first magnetic field component represented by one of the at least two second signals;

calculating a second value indicative of a difference between the second magnetic field component represented by another one of the at least two first signals and the second magnetic field component represented by another one of the at least two second signals; and determining, based on the first value and the second value, an angle of the rotatable shaft having a reduced stray-field influence, wherein the first magnetic field component, the second magnetic field component, and the rotation axis of the rotatable shaft are perpendicular to each other, wherein the first magnetic sensor and the second magnetic sensor are positioned at different radial distances from the rotatable shaft and a same angular position with respect to the rotation axis, and wherein the first magnetic sensor comprises a first magnetic sensor element and a second magnetic sensor element that overlap with one another at a center of the first magnetic sensor, and the second magnetic sensor comprises a third magnetic sensor element and a fourth magnetic sensor element that overlap with one another at a center of the second magnetic sensor.

19. The method of claim 18, wherein:

the first magnetic sensor and the second magnetic sensor are spaced apart from one another by a spacing distance, the first magnetic sensor is positioned a first radial distance from the rotatable shaft, the first magnetic sensor being closer to the rotatable shaft than the second magnetic sensor, and the spacing distance is greater than the first radial distance.

20. The method of claim 18, further comprising:

generating, via a third magnetic sensor, at least two third signals associated with a measurement of the first magnetic field component and the second magnetic field component of the magnetic field generated by the magnetic ring;

generating, via a fourth magnetic sensor, at least two fourth signals associated with a measurement of the first magnetic field component and the second magnetic field component of the magnetic field generated by the magnetic ring, wherein the first magnetic sensor and the second magnetic sensor are associated with a first sensor arrangement having a first central axis that bisects the first magnetic sensor and the second magnetic sensor and is perpendicular to the rotation axis of the rotatable shaft, and wherein the third magnetic sensor and the fourth magnetic sensor are associated with a second sensor arrangement having a second central axis that bisects the third magnetic sensor and the fourth magnetic sensor and is perpendicular to the rotation axis.

21. The method of claim 20, wherein the first central axis associated with the first sensor arrangement and the second central axis associated with the second sensor arrangement are positioned about the rotation axis at an angle with respect to one another that is equal to 180 degrees/P, with P being equal to a number of poles of the magnetic ring.

22. The method of claim 20, wherein:

the first magnetic sensor and the third magnetic sensor are each positioned a first radial distance from the rotatable shaft and at different angular positions with respect to the rotation axis, the second magnetic sensor and the fourth magnetic sensor are positioned a second radial distance from the rotatable shaft and at different angular positions with respect to the rotation axis, and the first radial distance and the second radial distance are different.

23. The method of claim 20, further comprising:

calculating a third value indicative of a difference between the first magnetic field component represented by one of the at least two third signals and the first magnetic field component represented by one of the at least two fourth signals;

calculating a fourth value indicative of a difference between the second magnetic field component represented by another one of the at least two third signals and the second magnetic field component represented by another one of the at least two fourth signals; and determining, based on the first value, the second value, the third value, and the fourth value, the angle of the rotatable shaft having a reduced stray-field influence.

24. The method of claim 18, wherein the act of calculating the angle of the rotatable shaft comprises:

multiplying a ratio of the first value and the second value by a matching factor k to yield a scaled ratio; and calculating an arctangent of the scaled ratio.

* * * * *